(12) United States Patent
Pietrzyk et al.

(10) Patent No.: US 7,510,110 B2
(45) Date of Patent: Mar. 31, 2009

(54) RFID ARCHITECTURE IN AN INDUSTRIAL CONTROLLER ENVIRONMENT

(75) Inventors: Arthur P. Pietrzyk, Thompson, OH (US); Vivek R. Bapat, Pittsburgh, PA (US); Sujeet Chand, Brookfield, WI (US); Kenwood H. Hall, Hudson, OH (US); Richard A. Morse, Hudson, OH (US); Joseph P. Owen, Jr., Elm Grove, WI (US); Andreas Somogyi, Sagamore Hills, OH (US); Kenneth A. Tinnell, Loveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 521 days.

(21) Appl. No.: 11/222,256

(22) Filed: Sep. 8, 2005

(65) Prior Publication Data

US 2007/0055470 A1    Mar. 8, 2007

(51) Int. Cl.
*G06K 19/06* (2006.01)
(52) U.S. Cl. ..................................... 235/375; 235/492
(58) Field of Classification Search ................. 235/375, 235/381, 382, 380, 492, 486, 487, 449, 382.5; 340/572.1
See application file for complete search history.

(56) References Cited

U.S. PATENT DOCUMENTS

| | | | |
|---|---|---|---|
| 3,858,212 A | 12/1974 | Tompkins et al. | |
| 4,949,299 A | 8/1990 | Pickett et al. | |
| 5,613,228 A | 3/1997 | Tuttle et al. | |
| 5,621,199 A | 4/1997 | Calari et al. | |
| 5,629,981 A | 5/1997 | Nerlikar | |
| 5,701,127 A | 12/1997 | Sharpe | |
| 5,703,347 A | 12/1997 | Reddersen et al. | |
| 5,785,181 A | 7/1998 | Quartararo, Jr. | |

(Continued)

FOREIGN PATENT DOCUMENTS

DE      10314260 A1      10/2004

(Continued)

OTHER PUBLICATIONS

International Search Report for PCT Application No. PCT/US06/34290, mailed Feb. 5, 2008, 2 pages.

(Continued)

*Primary Examiner*—Thien M Le
(74) *Attorney, Agent, or Firm*—Amin Turocy & Calvin LLP; R. Scott Speroff

(57) ABSTRACT

An RFID reader and/or writer module in an industrial controller (e.g., PLC). The RFID module interfaces internally to the controller for tight integration therewith. The RFID module can also be part of a controller communications framework and as a standalone module with the PLC as a master device, and interact with the RFID module in the same manner as it interacts with other I/O devices connected to the controller. In another aspect, RFID read/write tag technology is incorporated into some or all major PLC and rack components, and utilized for wireless communication both between PLC system components and between the PLC and other devices, locations, and media. The RFID tag can be used to store and exchange electronic keying data, security information, module diagnostics and warranty information, series and revision levels code, I/O configuration data, and, replacement data. Artificial intelligence is also employed.

57 Claims, 17 Drawing Sheets

U.S. PATENT DOCUMENTS

| | | | |
|---|---|---|---|
| 5,822,714 | A | 10/1998 | Cato |
| 5,874,724 | A | 2/1999 | Cato |
| 5,874,896 | A | 2/1999 | Lowe et al. |
| 5,905,249 | A | 5/1999 | Reddersen et al. |
| 5,910,776 | A | 6/1999 | Black |
| 5,949,335 | A | 9/1999 | Maynard |
| 5,963,134 | A | 10/1999 | Bowers et al. |
| 5,964,656 | A | 10/1999 | Lawler, Jr. et al. |
| 5,971,587 | A | 10/1999 | Kato et al. |
| 5,973,600 | A | 10/1999 | Mosher, Jr. |
| 6,049,745 | A | 4/2000 | Douglas et al. |
| 6,091,998 | A | 7/2000 | Vasko et al. |
| 6,116,505 | A | 9/2000 | Withrow |
| 6,121,878 | A | 9/2000 | Brady et al. |
| 6,144,301 | A | 11/2000 | Frieden |
| 6,150,948 | A | 11/2000 | Watkins |
| 6,154,790 | A | 11/2000 | Pruett et al. |
| 6,169,483 | B1 | 1/2001 | Ghaffari et al. |
| 6,170,059 | B1 | 1/2001 | Pruett et al. |
| 6,172,609 | B1 | 1/2001 | Lu et al. |
| 6,205,362 | B1 | 3/2001 | Eidson |
| 6,211,789 | B1 | 4/2001 | Oldham et al. |
| 6,263,440 | B1 | 7/2001 | Pruett et al. |
| 6,264,106 | B1 | 7/2001 | Bridgelall |
| 6,265,976 | B1 | 7/2001 | Roesner et al. |
| 6,272,321 | B1 | 8/2001 | Bruhnke et al. |
| 6,275,681 | B1 | 8/2001 | Vega et al. |
| 6,282,407 | B1 | 8/2001 | Vega et al. |
| 6,285,295 | B1 | 9/2001 | Casden |
| 6,286,762 | B1 | 9/2001 | Reynolds et al. |
| 6,286,763 | B1 | 9/2001 | Reynolds et al. |
| 6,293,467 | B1 | 9/2001 | Reddersen et al. |
| 6,305,548 | B1 | 10/2001 | Sato et al. |
| 6,307,517 | B1 | 10/2001 | Lee |
| 6,317,027 | B1 | 11/2001 | Watkins |
| 6,318,636 | B1 | 11/2001 | Reynolds et al. |
| 6,342,839 | B1 | 1/2002 | Curkendall et al. |
| 6,354,493 | B1 | 3/2002 | Mon |
| 6,362,738 | B1 | 3/2002 | Vega |
| 6,366,206 | B1 | 4/2002 | Ishikawa et al. |
| 6,377,176 | B1 | 4/2002 | Lee |
| 6,377,203 | B1 | 4/2002 | Doany |
| 6,392,544 | B1 | 5/2002 | Collins et al. |
| 6,400,272 | B1 | 6/2002 | Holtzman et al. |
| 6,401,936 | B1 | 6/2002 | Isaacs |
| 6,409,401 | B1 | 6/2002 | Petteruti et al. |
| 6,415,978 | B1 | 7/2002 | McAllister |
| 6,429,776 | B1 | 8/2002 | Alicot et al. |
| 6,445,297 | B1 | 9/2002 | Nicholson |
| 6,445,969 | B1 | 9/2002 | Kenney |
| 6,448,886 | B2 | 9/2002 | Garber et al. |
| 6,451,154 | B1 | 9/2002 | Grabau |
| 6,476,708 | B1 | 11/2002 | Johnson |
| 6,480,100 | B1 | 11/2002 | Frieden et al. |
| 6,484,886 | B1 | 11/2002 | Isaacs |
| 6,486,780 | B1 | 11/2002 | Garber |
| 6,501,382 | B1 | 12/2002 | Rehfus |
| 6,505,780 | B1 | 1/2003 | Yassin et al. |
| 6,517,000 | B1 | 2/2003 | McAllister et al. |
| 6,523,752 | B2 | 2/2003 | Nishitani et al. |
| 6,529,880 | B1 | 3/2003 | McKeen et al. |
| 6,547,040 | B2 | 4/2003 | Goodwin, III |
| 6,549,064 | B2 | 4/2003 | Bandy et al. |
| 6,554,187 | B2 | 4/2003 | Otto |
| 6,563,425 | B2 | 5/2003 | Nicholson et al. |
| 6,566,997 | B1 | 5/2003 | Bradin |
| 6,585,165 | B1 | 7/2003 | Kuroda |
| 6,593,853 | B1 | 7/2003 | Barrett et al. |
| 6,600,418 | B2 | 7/2003 | Francis et al. |
| 6,607,123 | B1 | 8/2003 | Jollifee et al. |
| 6,608,551 | B1 | 8/2003 | Anderson et al. |
| 6,608,561 | B2 | 8/2003 | Lawler, Jr. et al. |
| 6,612,495 | B2 | 9/2003 | Reddersen et al. |
| 6,617,962 | B1 | 9/2003 | Horwitz et al. |
| 6,621,417 | B2 | 9/2003 | Duncan et al. |
| 6,622,567 | B1 | 9/2003 | Hamel et al. |
| 6,641,042 | B1 | 11/2003 | Pierenkemper et al. |
| 6,650,227 | B1 | 11/2003 | Bradin |
| 6,664,897 | B2 | 12/2003 | Pape et al. |
| 6,669,089 | B2 | 12/2003 | Cybulski et al. |
| 6,672,512 | B2 | 1/2004 | Bridgelall |
| 6,677,852 | B1 | 1/2004 | Landt |
| 6,687,293 | B1 | 2/2004 | Loyer et al. |
| 6,693,539 | B2 | 2/2004 | Bowers et al. |
| 6,700,931 | B1 | 3/2004 | Lee et al. |
| 6,707,376 | B1 | 3/2004 | Patterson et al. |
| 6,712,276 | B1 | 3/2004 | Abali et al. |
| 6,714,121 | B1 | 3/2004 | Moore |
| 6,724,308 | B2 | 4/2004 | Nicholson |
| 6,726,099 | B2 | 4/2004 | Becker et al. |
| 6,745,008 | B1 | 6/2004 | Carrender et al. |
| 6,747,560 | B2 | 6/2004 | Stevens, III |
| 6,750,769 | B1 | 6/2004 | Smith |
| 6,752,277 | B1 | 6/2004 | Sempliner |
| 6,784,789 | B2 | 8/2004 | Eroglu et al. |
| 6,784,813 | B2 | 8/2004 | Shanks et al. |
| 6,791,603 | B2 | 9/2004 | Lazo et al. |
| 6,793,127 | B2 | 9/2004 | Alsafadi et al. |
| 6,802,659 | B2 | 10/2004 | Cremaon et al. |
| 6,808,116 | B1 | 10/2004 | Eslambolchi |
| 6,809,646 | B1 | 10/2004 | Lee |
| 6,812,838 | B1 | 11/2004 | Maloney |
| 6,828,902 | B2 | 12/2004 | Casden |
| 6,842,106 | B2 | 1/2005 | Hughes et al. |
| 6,847,856 | B1 | 1/2005 | Bohannon |
| 6,853,294 | B1 | 2/2005 | Ramamurthy et al. |
| 6,853,303 | B2 | 2/2005 | Chen et al. |
| 6,859,757 | B2 | 2/2005 | Muehl et al. |
| 6,870,797 | B2 | 3/2005 | Reasoner et al. |
| 6,873,260 | B2 | 3/2005 | Lancos et al. |
| 6,879,809 | B1 | 4/2005 | Vega et al. |
| 6,888,459 | B2 | 5/2005 | Stilp |
| 6,899,476 | B1 | 5/2005 | Barrus et al. |
| 6,901,304 | B2 | 5/2005 | Swan et al. |
| 6,903,656 | B1 | 6/2005 | Lee |
| 6,917,291 | B2 | 7/2005 | Allen |
| 6,918,541 | B2 | 7/2005 | Knowles et al. |
| 6,929,412 | B1 | 8/2005 | Barrus et al. |
| 6,940,408 | B2 | 9/2005 | Ferguson et al. |
| 6,943,678 | B2 | 9/2005 | Muirhead |
| 6,943,688 | B2 | 9/2005 | Chung et al. |
| 6,967,579 | B1 | 11/2005 | Elizondo |
| 6,992,574 | B2 | 1/2006 | Aupperie |
| 6,999,955 | B1 | 2/2006 | Horvitz |
| 7,023,342 | B2 | 4/2006 | Corbett et al. |
| 7,057,509 | B2 | 6/2006 | Gualdi et al. |
| 7,061,379 | B2 | 6/2006 | Chen et al. |
| 7,066,388 | B2 | 6/2006 | He |
| 7,066,687 | B2 | 6/2006 | Chapman et al. |
| 7,069,100 | B2 | 6/2006 | Monette et al. |
| 7,073,712 | B2 | 7/2006 | Jusas et al. |
| 7,075,412 | B1 | 7/2006 | Reynolds et al. |
| 7,079,023 | B2 | 7/2006 | Haller |
| 7,084,769 | B2 | 8/2006 | Bauer et al. |
| 7,114,655 | B2 | 10/2006 | Chapman et al. |
| 7,151,456 | B2 | 12/2006 | Godfrey |
| 7,165,722 | B2 | 1/2007 | Shafer et al. |
| 7,183,922 | B2 | 2/2007 | Mendolia et al. |
| 7,187,288 | B2 | 3/2007 | Mendolia et al. |
| 7,195,159 | B2 | 3/2007 | Sloan et al. |
| 7,212,637 | B2 | 5/2007 | Salisbury |
| 7,221,258 | B2 | 5/2007 | Lane et al. |
| 7,230,730 | B2 | 6/2007 | Owen et al. |
| 7,336,167 | B2 | 2/2008 | Olsen, III et al. |

| | | |
|---|---|---|
| 7,336,243 B2 | 2/2008 | Jo et al. |
| 2001/0000019 A1 | 3/2001 | Bowers et al. |
| 2001/0008390 A1 | 7/2001 | Berquist |
| 2002/0005774 A1 | 1/2002 | Rudolph |
| 2002/0067265 A1* | 6/2002 | Rudolph ................ 340/572.1 |
| 2002/0070862 A1 | 6/2002 | Francis et al. |
| 2002/0130778 A1 | 9/2002 | Nicholson |
| 2002/0143320 A1 | 10/2002 | Levin |
| 2002/0165758 A1 | 11/2002 | Hind et al. |
| 2002/0167397 A1 | 11/2002 | Eroglu et al. |
| 2002/0185532 A1 | 12/2002 | Berquist et al. |
| 2003/0007473 A1 | 1/2003 | Strong et al. |
| 2003/0023337 A1 | 1/2003 | Godfrey et al. |
| 2003/0102367 A1 | 6/2003 | Monette et al. |
| 2003/0109951 A1 | 6/2003 | Hsiung et al. |
| 2003/0169149 A1 | 9/2003 | Ohki et al. |
| 2004/0024644 A1 | 2/2004 | Gui et al. |
| 2004/0032443 A1 | 2/2004 | Moylan |
| 2004/0061324 A1 | 4/2004 | Howard |
| 2004/0062294 A1 | 4/2004 | Clemens et al. |
| 2004/0066281 A1 | 4/2004 | Hughes et al. |
| 2004/0069851 A1 | 4/2004 | Grunes |
| 2004/0095910 A1* | 5/2004 | Metts et al. ................ 370/338 |
| 2004/0108378 A1 | 6/2004 | Gatz |
| 2004/0124988 A1 | 7/2004 | Leonard et al. |
| 2004/0189442 A1 | 9/2004 | Eastburn |
| 2004/0220860 A1 | 11/2004 | Persky et al. |
| 2005/0012613 A1 | 1/2005 | Eckstein et al. |
| 2005/0021369 A1 | 1/2005 | Cohen et al |
| 2005/0035849 A1 | 2/2005 | Yizhack |
| 2005/0040934 A1 | 2/2005 | Shanton |
| 2005/0052283 A1 | 3/2005 | Collins et al. |
| 2005/0058483 A1 | 3/2005 | Chapman et al. |
| 2005/0083180 A1 | 4/2005 | Horwitz |
| 2005/0088299 A1 | 4/2005 | Bandy et al. |
| 2005/0092825 A1 | 5/2005 | Cox et al. |
| 2005/0093678 A1 | 5/2005 | Forster et al. |
| 2005/0110641 A1 | 5/2005 | Mendolia et al. |
| 2005/0140511 A1 | 6/2005 | Bonnell et al. |
| 2005/0143916 A1 | 6/2005 | Kim et al. |
| 2005/0145688 A1 | 7/2005 | Milenkovic et al. |
| 2005/0149414 A1 | 7/2005 | Schrodt et al. |
| 2005/0154572 A1 | 7/2005 | Sweeney |
| 2005/0155213 A1 | 7/2005 | Eastin |
| 2005/0159913 A1 | 7/2005 | Ariyoshi et al. |
| 2005/0162256 A1 | 7/2005 | Kinoshita |
| 2005/0170784 A1 | 8/2005 | Ariyoshi et al. |
| 2005/0177423 A1 | 8/2005 | Swanson |
| 2005/0179521 A1 | 8/2005 | Pillai et al. |
| 2005/0180566 A1 | 8/2005 | Ryal |
| 2005/0190098 A1 | 9/2005 | Bridgelall et al. |
| 2005/0200457 A1 | 9/2005 | Bridgelall et al. |
| 2005/0206552 A1 | 9/2005 | Friedrich |
| 2005/0206555 A1 | 9/2005 | Bridgelall et al. |
| 2005/0212660 A1 | 9/2005 | Hansen et al. |
| 2005/0212673 A1 | 9/2005 | Forster |
| 2005/0212676 A1 | 9/2005 | Steinberg |
| 2005/0219039 A1 | 10/2005 | Allen |
| 2005/0228528 A1 | 10/2005 | Farchmin et al. |
| 2005/0237162 A1 | 10/2005 | Hyde et al. |
| 2005/0240305 A1 | 10/2005 | Bogash et al. |
| 2005/0253717 A1 | 11/2005 | Howarth et al. |
| 2005/0253718 A1 | 11/2005 | Droms et al. |
| 2005/0258955 A1 | 11/2005 | Gloekler et al. |
| 2005/0269407 A1 | 12/2005 | Harmon |
| 2006/0006231 A1 | 1/2006 | Anson et al. |
| 2006/0027658 A1 | 2/2006 | Genc et al. |
| 2006/0038077 A1 | 2/2006 | Olin et al. |
| 2006/0049250 A1 | 3/2006 | Sullivan |
| 2006/0053234 A1 | 3/2006 | Kumar et al. |
| 2006/0071774 A1 | 4/2006 | Brown et al. |
| 2006/0125653 A1 | 6/2006 | McQuade |
| 2006/0145850 A1 | 7/2006 | Krstulich |
| 2006/0170565 A1 | 8/2006 | Husak et al. |
| 2006/0208859 A1 | 9/2006 | Hougen et al. |
| 2006/0279412 A1* | 12/2006 | Holland et al. ........... 340/10.51 |
| 2007/0008073 A1 | 1/2007 | Poasevara |
| 2007/0013517 A1 | 1/2007 | Posamentier |
| 2007/0013519 A1 | 1/2007 | Chung et al. |
| 2007/0035396 A1 | 2/2007 | Chand et al. |
| 2007/0040681 A1 | 2/2007 | Jessup |
| 2007/0063029 A1 | 3/2007 | Brandt et al. |
| 2007/0159311 A1 | 7/2007 | Schober |
| 2007/0205860 A1 | 9/2007 | Jones et al. |
| 2007/0205861 A1 | 9/2007 | Nair et al. |

FOREIGN PATENT DOCUMENTS

| | | |
|---|---|---|
| EP | 1542105 A | 6/2005 |
| WO | 0016289 | 3/2000 |
| WO | 0058752 | 10/2000 |
| WO | 0169516 | 9/2001 |
| WO | 02073523 | 9/2002 |
| WO | 03056403 A | 7/2003 |
| WO | 03056469 A | 7/2003 |
| WO | 2005045743 A | 5/2005 |

OTHER PUBLICATIONS

OA Dated Aug. 8, 2008 for U.S. Appl. No. 11/241,421, 49 pages.
OA Dated Aug. 28, 2008 for U.S. Appl. No. 11/129,199, 28 pages.
OA Dated Apr. 28, 2008 for U.S. Appl. No. 11/220,130, 29 pages.
OA Dated Apr. 30, 2008 for U.S. Appl. No. 11/185,114, 80 pages.
International Search Report for PCT Application Serial No. PCT/US06/34290, mailed Feb. 5, 2008, 2 pages.
European Search Report dated Feb. 6, 2006 mailed Feb. 20, 2006 for European Patent Application Serial No. 10/985,173, 3 Pages.
M. Karkkainen, et al.: "The product centric approach: a solution to supply network information management problems?" Computers in Industry, Elsevier Science Publishers. Amsterdam, NL, vol. 52, No. 2, Oct. 2003.
European Search Report dated Feb. 14, 2006 mailed Feb. 20, 2006 for European Patent Application Serial No. 10/985,621, 3 Pages.
Partial International Search Report dated Mar. 30, 2006, for PCT Application Serial No. PCT/EP2005/007878, 3 pages.
International Search Report dated May 17, 2006 for International Patent Application Serial No. PCT/EP2005/007878, 8 pages.

* cited by examiner

RFID ARCHITECTURE IN AN INDUSTRIAL CONTROLLER ENVIRONMENT

TECHNICAL FIELD

This invention is related to programmable logic controllers, and the implementation therein of RFID technology.

BACKGROUND OF THE INVENTION

In today's highly sophisticated, complex and intelligent automation systems, industrial controllers have powerful tools and features that could be simplified through the use of RFID (radio frequency identification). When implementing an RFID solution in a distribution center or a factory, it is customary to utilize three distinct platforms: an RFID reader/antenna, RFID "middleware" running on a standard PC (personal computer), and a PLC (programmable logic controller). Each platform requires its own configuration and management resulting in higher costs in implementation and support (e.g., by wiring and labor for three platforms, different environments, and operator training). Moreover, the reader and PC may not be ruggedized for an industrial environment.

The traditional approach is to have an RFID reader connection to the PLC via a network using, for example, RS-232 serial communications, Ethernet, or any of the field buses such as DeviceNet, ControlNet, etc. Using such technologies typically involves the use of interface cards and/or logic that requires software control, power needs, and additional hardware maintenance. Moreover, in that there are other communications links involved, it is possible to have missed packets, in addition to the implementation of slower communications speeds due to these links or network dependencies. The interface between an RFID reader and a PLC must be both fast and reliable. The speed determines the rate at which RFID tags can be read and the reliability of this interface determines the usability of the RFID information. By using shorter communications pathways and such pathways that can be dedicated, it is possible to achieve higher bandwidth communications. Accordingly, there is an unmet need in the art for an improved RFID system in the automation regime.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The disclosed architecture, in one aspect thereof is architecture that can use radio frequency identification (RFID) as a wireless means for capturing, storing and sending information and control parameters. All of the captured information can be made available via an RFID reader device that scans the system and its components reading the tags from modules, racks, power supplies, processors, and so on. This information can include configuration data, series/revision information, and diagnostics data, for example. Once scanned and recorded, the entire system configuration and status can be transmitted to a remote support site for duplication in order to perform evaluations such as diagnostics, warranty, and troubleshooting.

Additionally, using RFID to store internal information, data, and code can improve maintenance, reduce errors and downtime when modules are replaced, and can be used as a major game changer/differentiator, since many of the manual interactions could be automated with "smarter" PLC (programmable logic controller) components that automatically communicate with each other without additional external wires, HMI (Human Machine Interface), etc.

Accordingly, the invention disclosed and claimed herein, in one aspect thereof, comprises implementation of an RFID reader (or reader module) into a controller (e.g., a PLC). This module contains an RF (radio frequency) interface, logic, and processor to function as an RFID reader, but instead of residing external to the controller and as a node on a network, the reader resides internal to the controller and interfaces to an internal communications framework of the PLC (e.g., a controller backplane). Use of the internal communications framework of the controller facilitates faster, more reliable communications between the controller and the reader, and reduces or eliminates missed packets that can normally occur over a loaded packet-based network. Such packet-based communications can include CIP (Common Industrial Protocol), which is an open protocol to allow direct communication with a controller, or a middleware software module.

When internalized to the controller, the RFID reader module can connect to an RFID reader antenna via an RF coaxial cable. The antenna can be a traditional RFID reader antenna. This invention can accommodate all types of RFID readers from Low Frequency to High Frequency, Ultra High Frequency, and standard RFID tags to 2.4 GHz tags, for example, and finds applications at least with Logix™, SLC (Small Logic Controller) and other PLC architectures.

In another aspect of the subject invention the RFID reader is mounted internal to the controller and interface directly to a packet-based network from inside the PLC for tight integration with the PLC. For example, the RFID reader interface to the network can include support for CIP. RFID tag data can be packaged into an application-level protocol (e.g., CIP), and transmitted over the network to the controller. Additionally, a controller can now act as the "master" node on the network and interact with the RFID reader (a node) in the same manner as it interacts with other input and output (I/O) devices connected to the controller.

In yet another aspect thereof, not only is the RFID reader integrated into the controller, but also the middleware software can be directly integrated into the PLC for direct interface to the network or indirectly via the PLC. This provides a single hardware and software environment (and lowest cost solution) to the user. This solution is designed for reliable operation in an industrial environment, and finds application where RFID tags can also be utilized to send diagnostics data along with the tag data. The diagnostics data can be collected by the tag due to the presence of one or more sensors with the tag, for example.

In still another aspect of the invention, multiple RFID readers can be integrated with the controller (e.g., PLC). Currently, filtering across the multiple RFID readers is difficult and requires significant implementation effort. The controller implementation of the subject invention can utilize signal strengths from individual readers to determine who may "own" a tag. Additionally, in many systems, RFID is being used in concert with bar codes. Since bar code readers can be integrated with the controller, the controller can now coordinate the bar code reads with the RFID reads.

In another aspect, read/write tag technology can be incorporated into all major PLC components and utilized for wireless communication both between PLC system components and between the PLC and other devices, locations, and media. The use of RFID to store and exchange information includes the following uses: electronic keying such that agreement between RFID in a rack and on modules can be checked; security information that is based and stored at the physical device level (e.g., a processor could be at a different level than the I/O); module diagnostics and warranty information can be read from the module without the current requirement to program logic to monitor diagnostic bits; series and revision levels code be read and verified; a rack-based tag can store the I/O configuration so that a replacement module can easily be inserted and powered up sooner; and, a smart module would know it is a valid replacement and could automatically read its configuration and set up.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
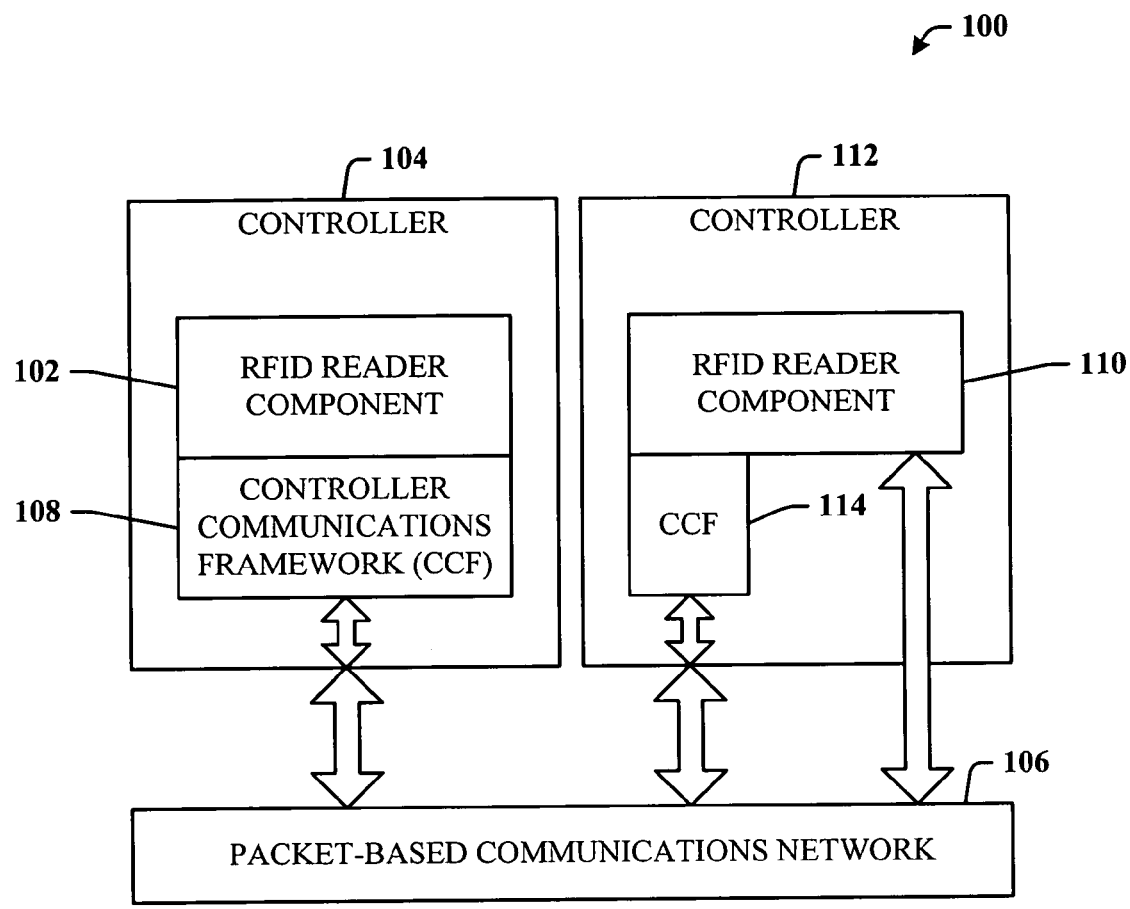
FIG. 1 illustrates an RFID system in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates an RFID (radio frequency identification) system 100 in accordance with the subject invention. The system 100 can include an RFID reader component that can be employed in a number of different locations. It is to be appreciated the system 100 can employ strictly an RFID reader; however, the combined functionality of the reader/writer can provide a more robust implementation, where desired. Accordingly, as understood herein, the subject invention finds application to an RFID reader/writer, as well as an RFID reader. In one implementation, a first RFID reader component 102 can be employed in a controller 104 (e.g., a programmable logic controller-PLC) that connects indirectly to a packet-based communications network 106 via an internal controller communications framework (CCF) 108. The controller 104 can typically be utilized in a manufacturing, distribution, sales or any similar environment where products (or objects) are tagged with an RFID tag and logistically managed. The RFID reader component 102 interfaces to the network 106 via an internal network connection(s) of the controller 104.

In such highly automated environments, PLCs (or other types of industrial controllers) are typically employed in a crate or chassis (not shown) in a rackmount configuration at selected locations throughout the industrial environment with additional modules employed therein for such applications as discrete I/O, power, communications, etc. The crate can interface to the network 106 to which modules of the crate connect for intercommunications with each other and external components (e.g., networks, databases, other rackmount systems, . . . ). The PLC typically provides the "brains" of the crate, although this need not always be the case, since each module of the crate can employ its own processor and applications for execution. Additionally, or alternatively, each module of the crate can be configured as a separate addressable node on the network 106. The network 106 is suitable to accommodate protocols such as Ethernet, CIP, DeviceNet, ControlNet, and other packet-based architectures.

In another implementation, a second RFID component 110 can be employed internal to a second controller 112 as a separate module that in one instance interfaces directly to the network 106, and in another instance interface to a CCF 114 for internal communications only. In this manner, many such RFID reader components can be employed in combination with a controller. Here, the second controller 112 can also communicate directly with the network 106. Utilization of the packet-based network can facilitate addressing each of the modules (102, 104, 110, and 112) separately using packet header information that defines a destination and source for each packet.

It is to be appreciated that any combination of the aforementioned configurations can be employed. For example, in one application it may be beneficial to include an RFID reader component in a controller thus preserving space in the crate for other modules. In another application, the controller/RFID component combination can be employed with another RFID reader component as a separate module for backup purposes in a more critical environment where if one RFID reader component fails, the other is online and ready to be enabled. In yet another application, both (or multiple) of the RFID reader components are operational and reading the same data that is then compared to ensure proper reads. These are but a few examples of the combinations of reader components (102 and 110) that can be employed in a controller/crate (or network) configuration in accordance with the subject invention.

The subject invention can support all types of RFID readers and reader/writers from low frequency to high frequency, UHF (ultra-high frequency), and standard RFID tags to 2.4 GHz tags, for example. This can also be applied to the Logix™ systems, SLC (Small Logic Controller), and PLC architectures.

Following are at least some of the benefits that can be obtained by employing the RFID reader in a PLC. The PLC internal communications framework is utilized for communications which is more reliable, thereby eliminating the need for the network. By employing the CCF for communications, missed packets for communications can be reduced or even eliminated and faster communications is enabled so that data from the RFID reader can be easily combined with other sensor information to verify the accuracy of the tag read operation. Moreover, use of CCF communications is easier to configure, debug, and troubleshoot than network communications. Additionally, since the RFID reader (or R/W) can be part of the PLC, its configuration can be stored in the PLC making replacement and initial configuration easier. The invention also reduces power consumption and bandwidth consumption by eliminating the need for a network interface between the reader and the PLC.

There is no longer any need to configure the RFID reader as a standalone device. Moreover, it reduces the complexity of interfacing the RFID reader to the PLC. This innovation increases the rate at which RFID tags can be read by eliminating the network transmission delays. The RFID tag can be read by the reader and tag data transferred directly to the memory of the PLC with no significant delay. Using an Event Task mechanism in LogiX™, a task could be configured to run at the arrival of a new tag.

The invention reduces the overall size and weight of the system by eliminating the need for an external reader. The reader module can be housed in the backplane of the PLC and use the PLC power supply and/or in the backplane and use the crate power supply. This eliminates the need for an external box, power supply, and network interface.

Figure 2:
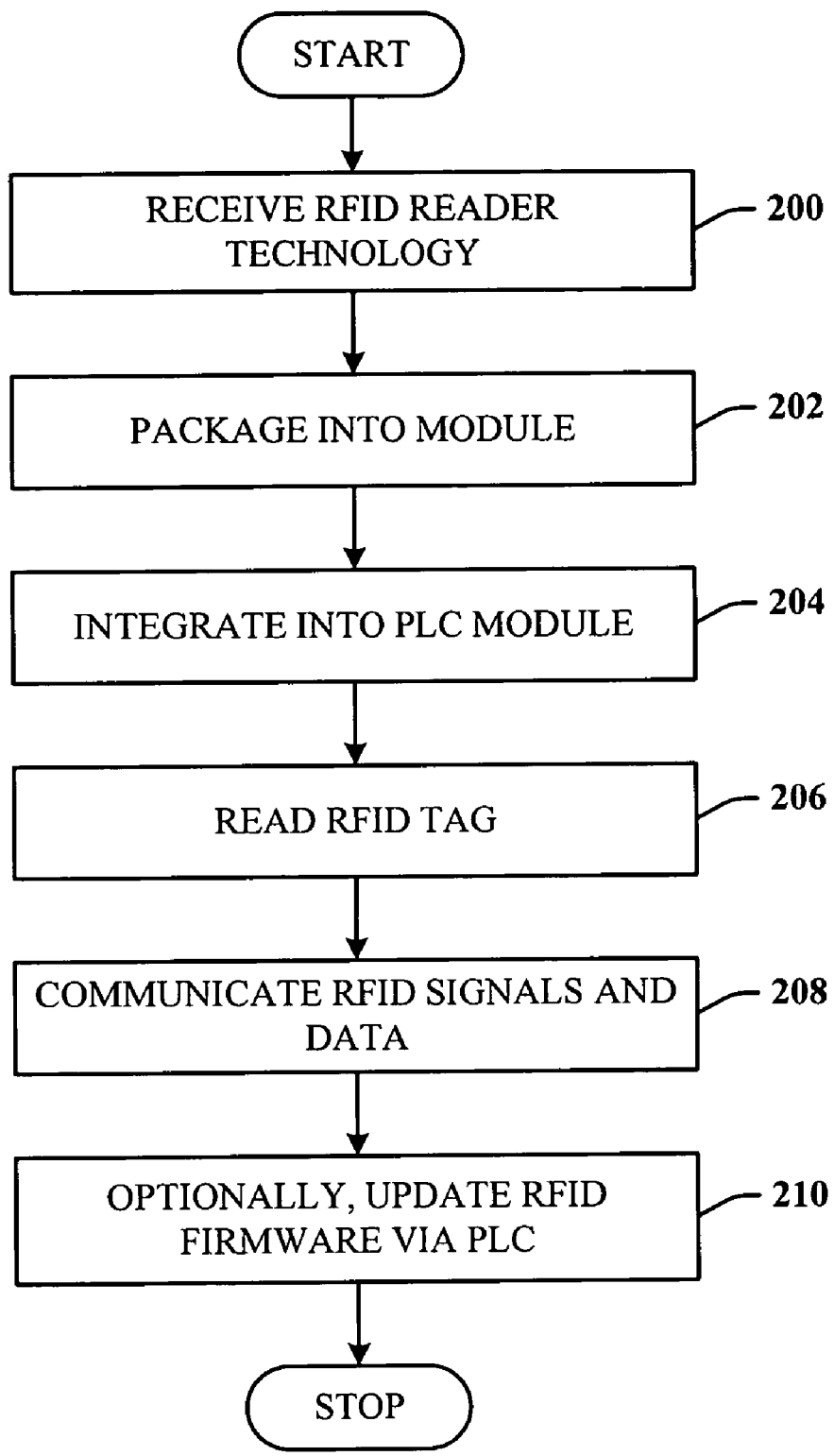
FIG. 2 illustrates a methodology of providing an RFID R/W in accordance with the invention.

FIG. 2 illustrates a methodology of providing an RFID reader in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, RFID reader technology is received for configuration. At 202, the RFID reader technology can be packaged into a module that is internalized to the PLC, and that interfaces directly with the PLC communications framework. Alternatively, or in combination therewith, the RFID reader component can be packaged as a separate module external to the PLC, but that is compatible with the crate such that it can be received into the crate in a manner similar to the PLC module. Alternatively, or in yet another combination therewith, the RFID reader component can be packaged as a separate module integral to the CCF. At 204, an RFID tag is read.

At 206, the RFID reader reads RFID tag data which is communicated by any of a number of different ways. At 208, the RFID signals and/or data can then be communicated. Where the RFID reader component is integrated into the CCF, the RFID tag data is communicated through the CCF into the controller memory. Where the RFID reader component is a separate module of the crate, the RFID tag data can be communicated out the RFID reader module across the crate network medium to the PLC where it can be processed and stored.

Modularization of the RFID reader component also provides other benefits. For example, at 210, firmware updates can be more easily implemented by downloading such updates to the controller, and over the CCF to the RFID reader module integrated into the CCF.

Figure 3:
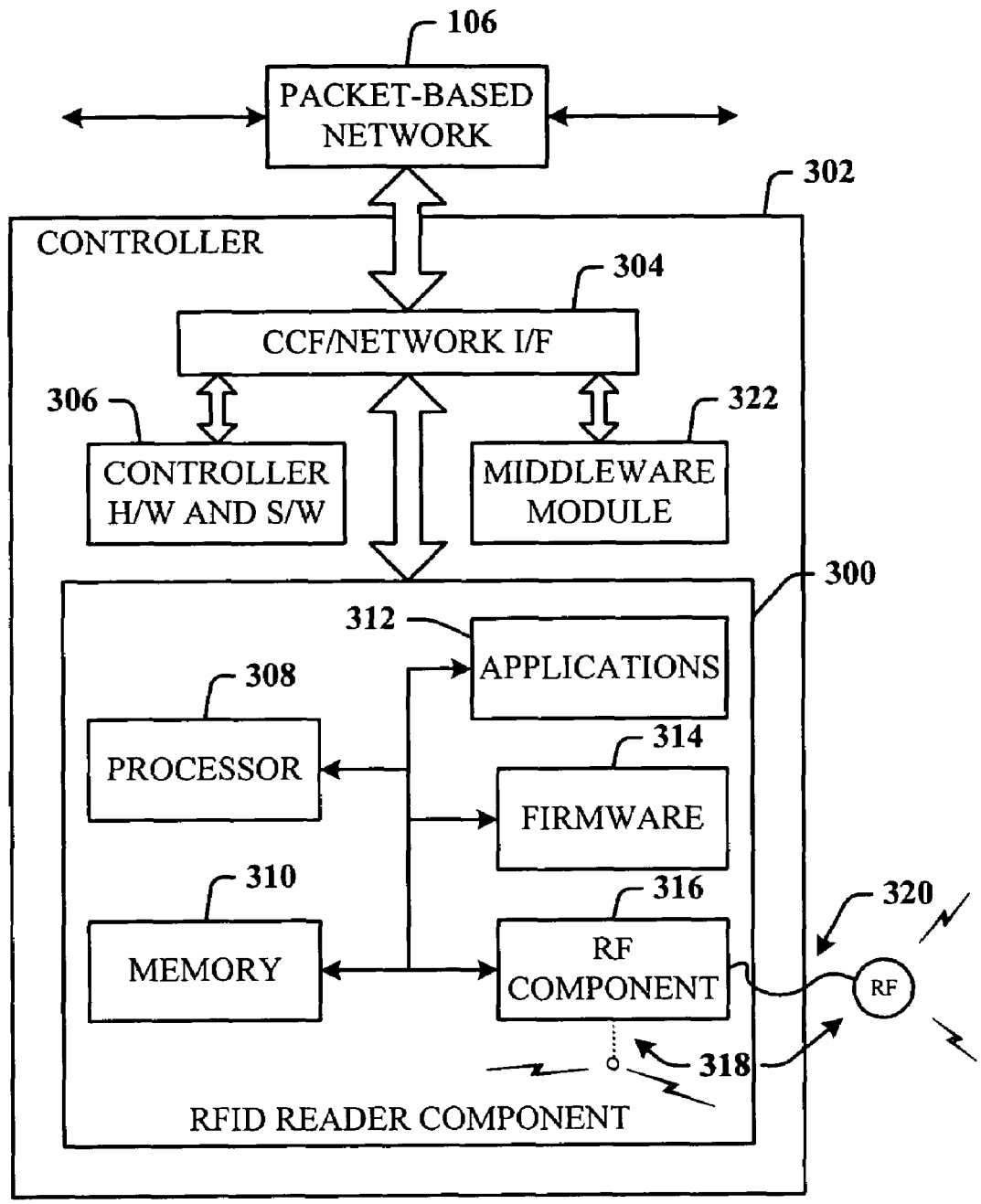
FIG. 3 illustrates a block diagram of an RFID R/W component internal to a controller in accordance with the invention.

Referring now to FIG. 3, there is illustrated a block diagram of an RFID reader component 300 internal to a controller 302 (e.g., a PLC) in accordance with the invention. The controller 302 interfaces to the packet-based network 106 via a CCF/network interface 304. Similarly, internal controller hardware and/or software components 306 can also connect to the CCF/network interface 304.

The RFID reader component 300 can include the following: a processor 308 that handles all onboard operations thereof; a memory 310 for storing RFID tag data and/or caching RFID applications used by the component 300; an applications component 312 that stores one or more applications related to reading and/or writing RFID signals and data with an RFID tag, intermodule communications applications, and applications that facilitate communications with external RFID subsystems; a firmware component 314 that stores startup information and instructions which can be updated, as well as the applications; and, an RF communications component 316 that facilitates RF communications such that an RFID tag can be read from and/or written to. Associated with the RF communications component 316 is an antenna 318 which can be internal to the RFID reader component 300, and/or be external thereto and connected via a coaxial cable 320.

The RFID reader component 300 plugs or hard connects into the CCF/network interface 304 of the controller 302 for tight integration with the controller 302. For example, the RFID reader component 300 interface to the CCF/network interface 304 can include support for the CIP open protocol to allow direct communication with the controller 302, and/or a middleware module 322. The middleware module 322 is a software component that facilitates onboard processing of tag signals and data by the controller 302, instead of remote processing on a separate PC, as can be performed conventionally. RFID tag data is packaged into an application-level protocol (e.g., CIP) by the RFID reader component 300 and transmitted over the CCF/network interface 304 to the controller 302. Additionally, the controller 302 may now act as the "master" in the CCF and/or network, and interact with the RFID reader component 300 in the same manner as it interacts with other input and output devices.

This tighter integration between the controller 302 and the RFID reader (or R/W) component reduces programming and configuration time during the commissioning of an RFID-enabled system. Additionally, the controller 302 can provide "secure" storage of RFID data and attributes as an intermediate step to moving the data to a website. Such a system can be called an RFID-enabled controller.

In one aspect of the invention, the middleware module 322 can be tightly integrated with the CCF/network interface 304. This provides a single hardware and software environment (and lowest cost solution) to the user. This solution is designed for reliable operation in an industrial environment, and finds application where RFID tags may also be utilized to send diagnostics data along with the tag data. The diagnostics data is collected by the tag due to the presence of one or more sensors with the tag. Here, the middleware module 322 is depicted as external to the RFID reader component 300 and in direct communications with the CCF/network interface 304; however, it is to be appreciated that the middleware 322 can be integrated into the RFID component 300 or the controller hardware/software component 306.

Figure 4:
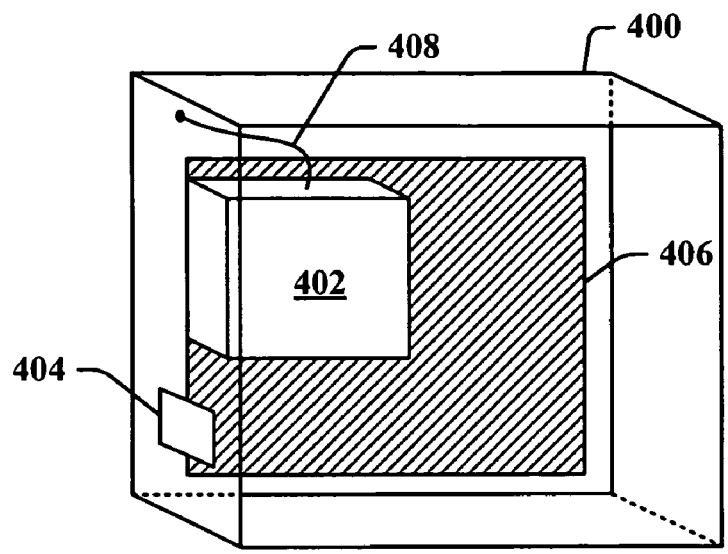
FIG. 4 illustrates a physical representation of a controller that employs an internal RFID R/W component in accordance with the invention.

FIG. 4 illustrates a physical representation of a controller 400 that employs an internal RFID reader component 402 in accordance with the invention. The controller 400 includes a CCF/network interface 404 that facilitates interconnecting to a crate (not shown). The RFID reader component 402 can also utilize the CCF/network interface 404 to connect to the crate, the controller 404, and/or other external crate modules connected to the crate. Alternatively, or in combination therewith, the RFID reader component 402 can connect to a motherboard 406 of the controller 400 such that connectivity between the RFID reader component 402 and the controller 400 is directly via the motherboard and not via the CCF/network interface 404. In this scenario, the RFID reader component 402 can be provided as an ASIC (Application Specific Integrated Circuit) that is manufactured as part of the motherboard logic and circuits. The RFID reader component 402 also includes an antenna 408 that is utilized for RF communications with RFID tags. In a more robust implementation, the RFID reader component 402 can communicate wirelessly with external systems using the antenna 408, in lieu of or in addition to using the CCF/network interface 404 to access a network.

Figure 5:
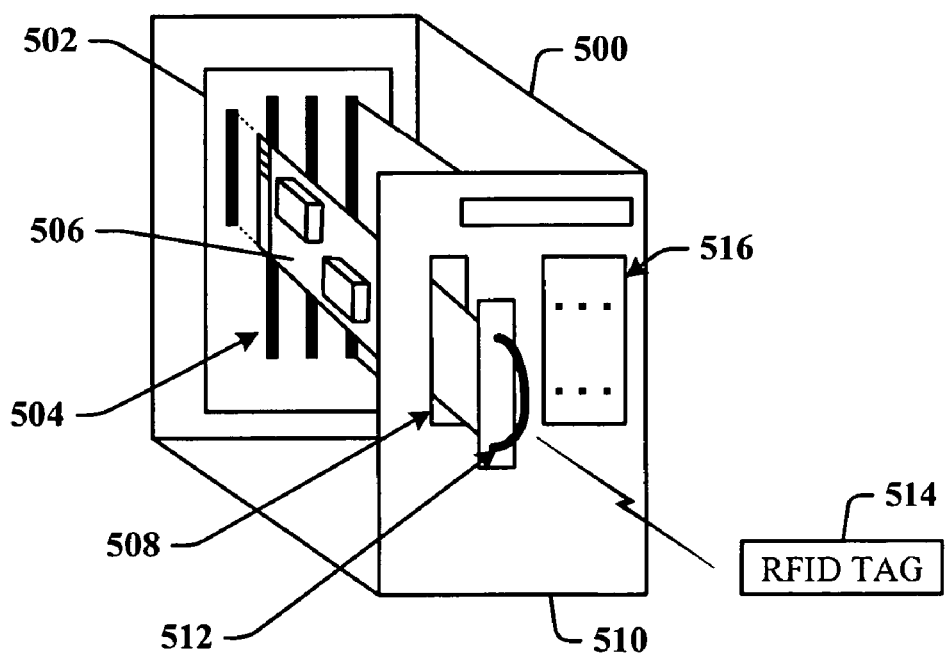
FIG. 5 illustrates a physical representation of a controller that employs a removable RFID R/W component in accordance with the invention.

FIG. 5 illustrates a physical representation of a controller 500 that employs a removable RFID reader component 502 in accordance with the invention. The controller 500 includes a CCF/network interface 502 that can include a number of connectors 504 that receive boards. For example, in this particular implementation, a RFID reader component is employed on a removable board 506 that that can be removed through a slot 508 in a front panel 510 of the controller 500. The board 506 can include a handle 512 for insertion and removal thereof, and through which an antenna (not shown) can be threaded to provide unimpeded electronic communications access to an RFID tag 514. The controller 500 can also employ front panel indicators 516 that provide indication to a user of certain states of the controller (e.g., power, network connection, RFID R/W component status, . . . ).

Figure 6:
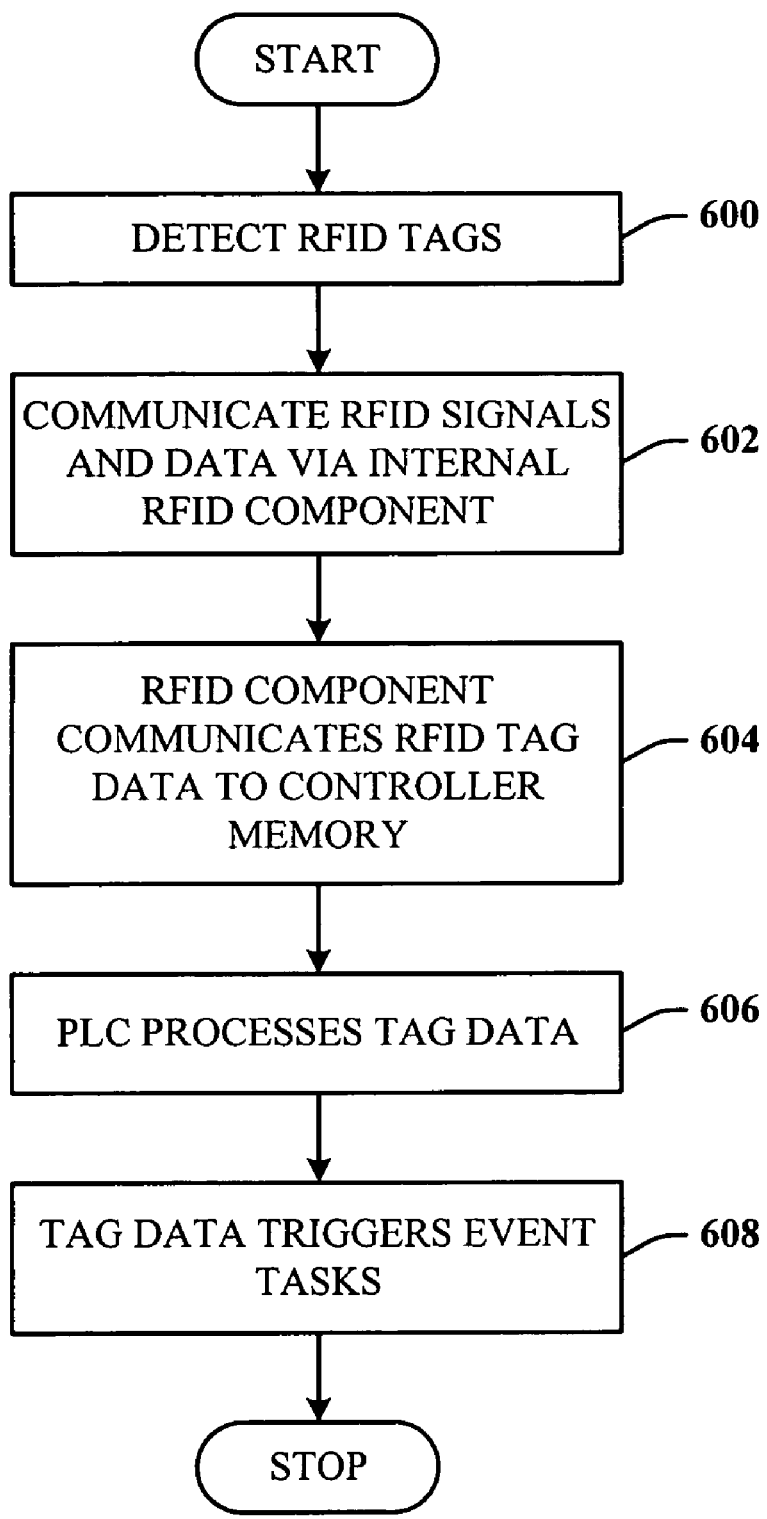
FIG. 6 illustrates a methodology of triggering event tasks in accordance with the invention.

FIG. 6 illustrates a methodology of triggering event tasks in accordance with the invention. At 600, one or more RFID tags are detected and read by an RFID reader component mounted internal to a controller. At 602, RFID data and/or signals are communicated by the internal RFID reader component. At 604, the tag data is communicated to the controller memory either directly via the CCF/network interface. At 606, the controller processes the tag data. At 608, processing of the tag data triggers one or more event tasks in the controller and/or RFID reader component.

Figure 7:
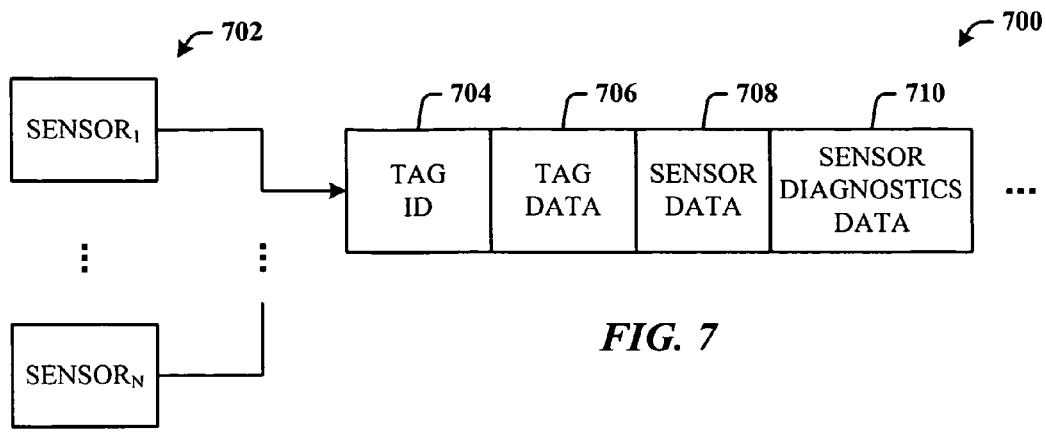
FIG. 7 illustrates an exemplary RFID tag information message that includes sensor-related data in accordance with the subject invention.

FIG. 7 illustrates an exemplary RFID tag information message 700 that includes sensor-related data in accordance with the subject invention. In one implementation, an RFID tag can be associated with one or more sensors 702 (denoted $SENSOR_1, \ldots, SENSOR_N$) such that the sensor data can be included as part of the RFID tag information message 700 that is transmitted to the RFID reader component. The sensors 702 can include environmental sensors related to temperature, humidity, barometric pressure, etc., that allows for monitoring of corresponding parameters while the associated object, package, pallet, is being prepared, shipped, and so on. Other conventional sensors can be employed as desired (e.g., accelerometers, strain gages, load cells, . . . )

In support thereof, the message 700 can support tag ID data 704 that uniquely identifies the tag, tag data 706 that includes information related to the object to which it is attached or associated, sensor data 708 that is related to the one or more sensors 702 associated with the tag, and sensor diagnostic data 710 related to one or more of the sensors 702. It is to be appreciated that other information can also be transmitted with the message 700, as desired by the particular application.

Figure 8:
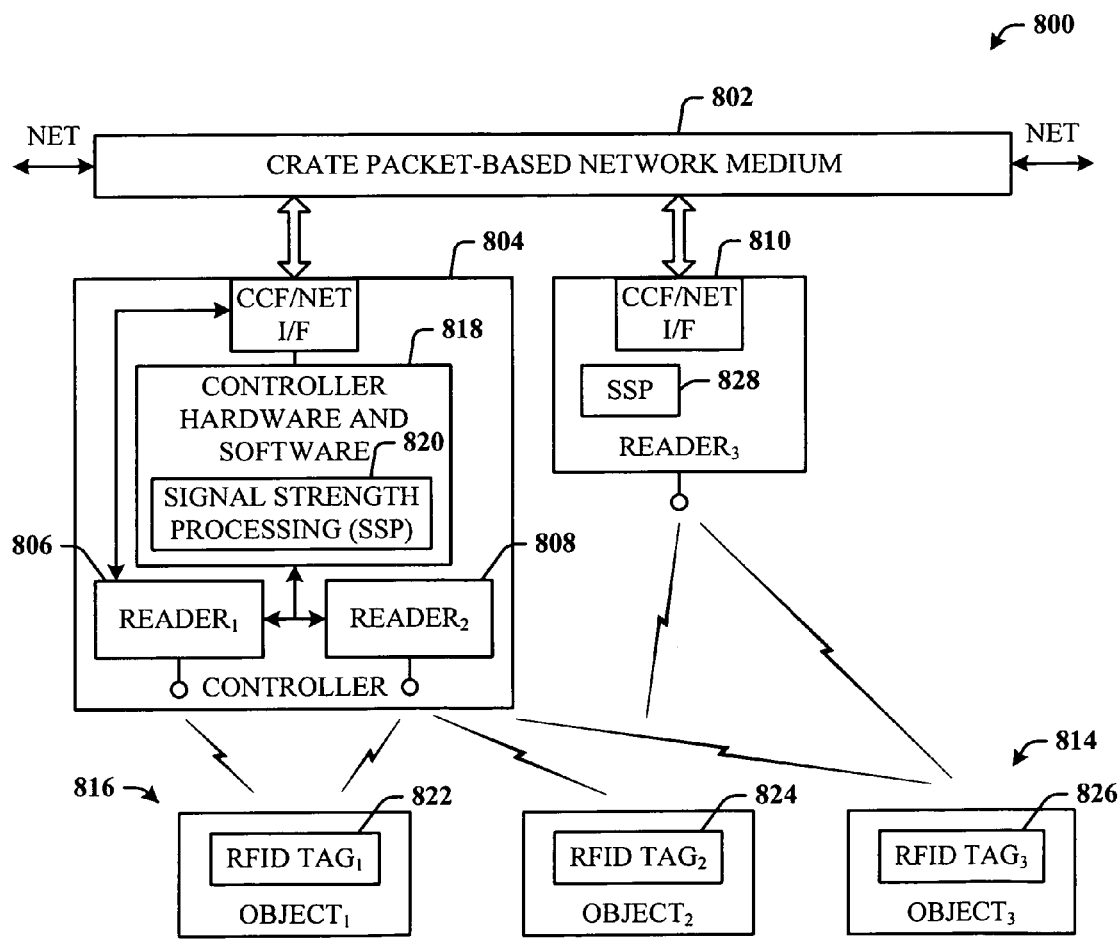
FIG. 8 illustrates a system that employs signal strength processing with multiple readers in accordance with the invention.

FIG. 8 illustrates a system 800 that employs signal strength processing with multiple readers in accordance with the invention. In another aspect of the invention, multiple readers can be integrated with the controller. Filtering across multiple RFID readers is difficult today and requires significant implementation effort. The controller implementation of the subject invention can utilize signal strengths from individual readers to determine which reader may "own" a tag.

Accordingly, there can be provided in one implementation a crate packet-based network medium 802 that facilitates communications between at least a controller 804 that includes a first internal reader 806 (denoted READER$_1$) and a second internal reader 808 (denoted READER$_2$), and an external RFID reader 810 (denoted READER$_3$). Here, the controller 804 includes the first reader 810 and second reader 812 one or both of which can be used for reading RFID tags 814 (denoted RFID TAG$_1$, RFID TAG$_2$, and RFID TAG$_3$) attached to corresponding objects 816 (denoted OBJECT$_1$, OBJECT$_2$, and OBJECT$_3$). The controller 804 and the external reader 810 each include a CCF/network interface (denoted CCF/NET I/F) that is one of the interfaces to the crate network medium 802.

The controller 804 can also include a hardware/software component represented at 818 that provides all desired controller-based hardware/software functionality. The component 818 can also include a signal strength processing component 820 that facilitates signal strength processing among several of the local readers (806, 808, 810 and 812). This can also include remote readers (not shown) that may be "slave" modules in remote crates (not shown), but that are managed by the controller 804 (the "master"). In this master/slave relationship, the slave devices are treated as I/O devices and interact with the controller 804 in the same manner as other I/O modules. In that the RFID data is now stored in the controller 804, the controller 804 can provide secure storage of the data and associated attributes as an intermediate step to communicating the data and/or attributes to a website (e.g., Internet-based website).

As described supra, conventionally, when passive transponders are employed, a reader broadcasts energy that energizes all tags in a given vicinity, thereby receiving data back that it may not need. The read operation can occur many times (e.g., hundreds or thousands) over a short period of time. If a pallet comes into range, and the pallet includes a tag, the objects on the pallet each include a tag, and the objects further include items therein that each include tags, the amount of read information can be large. In such a scenario, the reader can be programmed to perform a read only for a short period of time (e.g., milliseconds), and then turn off. Thereafter, the middleware software can be activated to process the tag information that was read. Note that the middleware software need not reside in the controller, but can reside anywhere on the network, or perhaps in a separate module in the same crate as the controller 804. Similarly, with active transponders, the tag automatically sends its tag data when signaled to do so by readers that are broadcasting.

Alternatively, of the active tag includes clock logic, the tag can be programmed to transmit data at predetermined times (e.g., every hour). Here, the internal readers (806 and 808) signal a first tag 822, a second tag 824 and a third tag 826 to send their respective tag data. However, in an environment where there may be hundreds or even thousands of objects and associated tags devices, and which objects/tags can be moving at a high rate of speed (e.g., on an assembly line), the data handling requirements can place a significant burden on the control system. Thus, it can be beneficial for any given reader and the control system in general, to only read tags that are within its range. The signal strength processing component 820 facilitates this by monitoring and computing signal strength values that are processed by the controller 804 and then used to filter readers and tags.

In this example, once the controller 804 receives a return tag signal from each of the three tags (822, 824, and 826), signal strength values are computed. Knowing the location of the external reader 810 and/or the internal readers (806 and 808), the controller 804 can then "assign" the tags (822, 824, and 826) to the respective readers (806, 808, and 810) for processing in order to offload some of the processing requirements that would normally need to be performed on all three of the tags (822, 824, and 826), to the other readers.

Alternatively, each system can include signal strength processing (SSP) capability. For example, the controller 804 can include the SSP 820, and the external reader 810 can also include an SSP 828. Thus, each system performs its own signal strength value computations and transmits the values to the controller 804 for final determination as to which of the readers (806, 808 and 810) gets assigned to process which of the tags (822, 824, and 826). In this example, the first internal reader 806 is assigned to process the tag data for the first tag 822 and the external reader 810 is assigned to process the tag data for the second tag 824 and the third tag 826.

Figure 9:
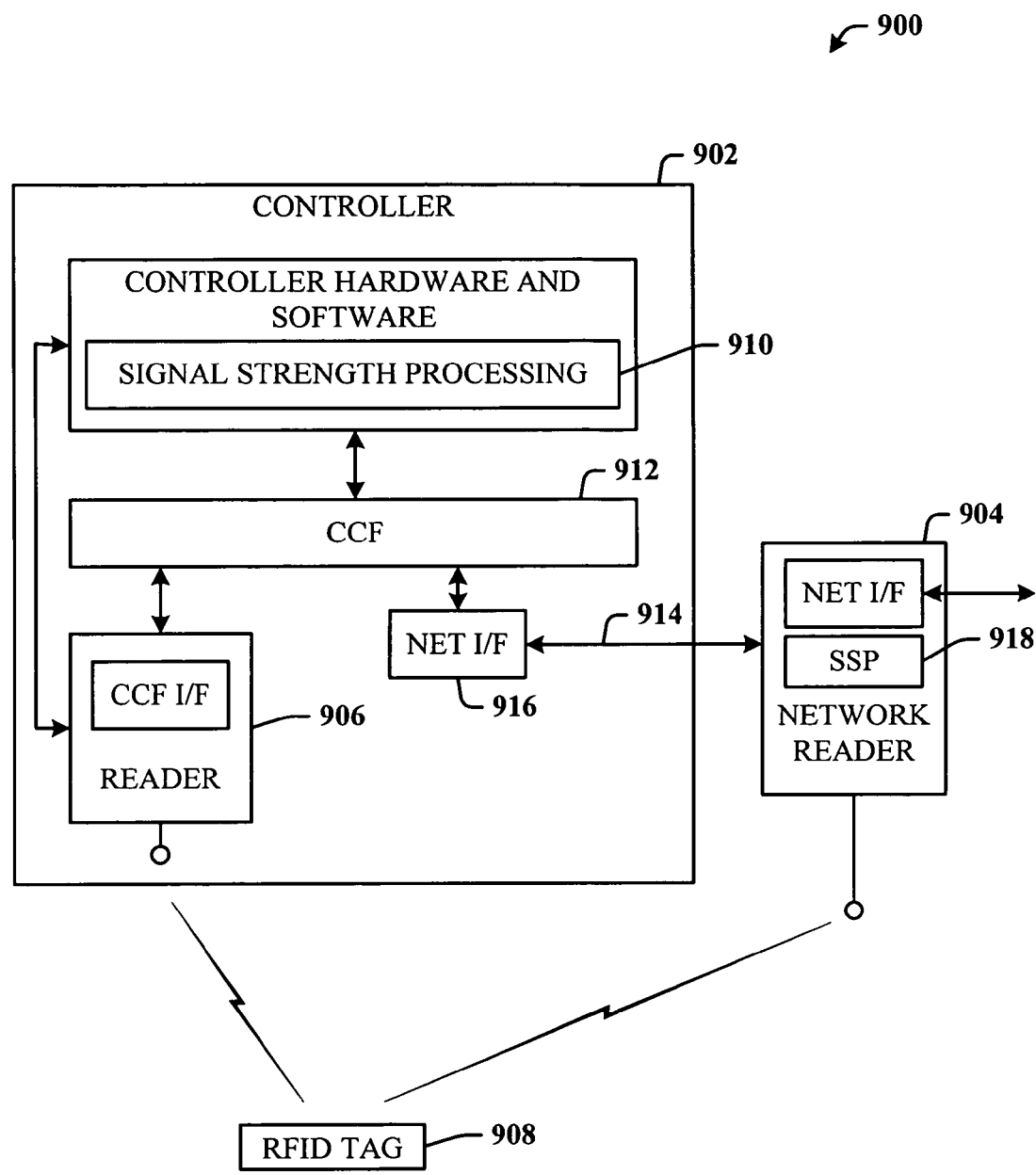
FIG. 9 illustrates a system where a controller communicates with a remote network-based reader in accordance with the invention.

FIG. 9 illustrates a system 900 where a controller 902 communicates with a remote network-based reader 904 in accordance with the invention. The controller 902 includes an internal reader 906 for reading an RFID tag 908. The controller 902 also can include a signal strength processing component 910 that processes return tag signals in order to determine a signal strength value for the tag 908. The controller 902 includes a CCF 912 that facilitates interfacing to a network 914 via a network interface 916. Interfacing to the network 914 can be by way of a wired and/or wireless technology. Disposed on the network 914 is the remote reader 904 that can also read the RFID tag 908. The remote reader 904 can also include an SSP component 918 that facilitates signal strength value computation such that a value associated with reading the tag 908 can be transmitted to a remote site for processing (e.g., the controller 902). In this scenario, the controller 902 receives and processes the remote value with a local value received via the internal reader 906. The controller can then determine which reader should be assigned to process tag data of the tag 908.

Figure 10:
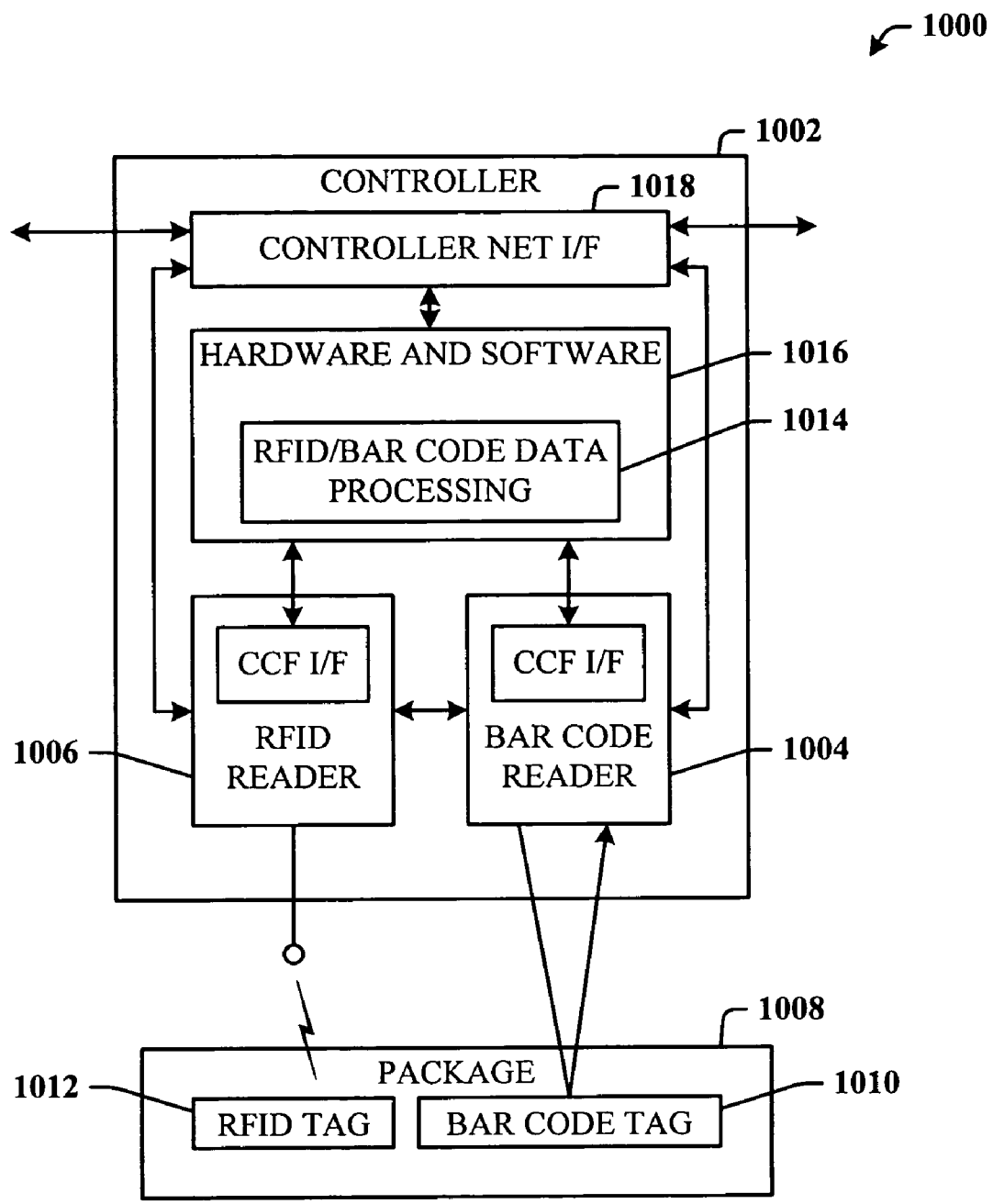
FIG. 10 illustrates a bar code-RFID reader system in accordance with the invention.

In many conventional systems, RFID technology is being used in concert with bar codes. Since bar code readers are already integrated with the controller, the controller can now coordinate the data of a bar code with the data of a corresponding RFID tag. Accordingly, FIG. 10 illustrates a bar code-RFID reader system 1000 in accordance with the invention. The system 1000 includes a controller 1002 that comprises both a bar code scanner 1004 and an RFID reader 1006. When a package 1008 passes within range to be processed, the internal bar code scanner 1004 scans a bar code tag 1010 attached to the package 1008 and the internal RFID reader 1006 reads an attached RFID tag 1012. The bar code data and RFID data are then passed to an RFID/bar code data processing component 1014 of controller hardware and software component 1016 that processes and compares some or all of the tag data as a means to verify package and tag data, for example. Although both the RFID reader 1006 and the bar code scanner 1004 are shown to be internal to the controller 1002, either or both can be separate modules as the controller 1002 in the same crate or different crates as desired for a given application. The bar cod reader 1004 and the RFID reader 1006 are shown to interface to the hardware/software component 1016 via CCF interfaces, and can also interface to a controller network interface 1018 for network access to services disposed thereon (such as can be provide on an Ethernet network, DeviceNet network, ControlNet network, and other packet-based networks).

Figure 11:
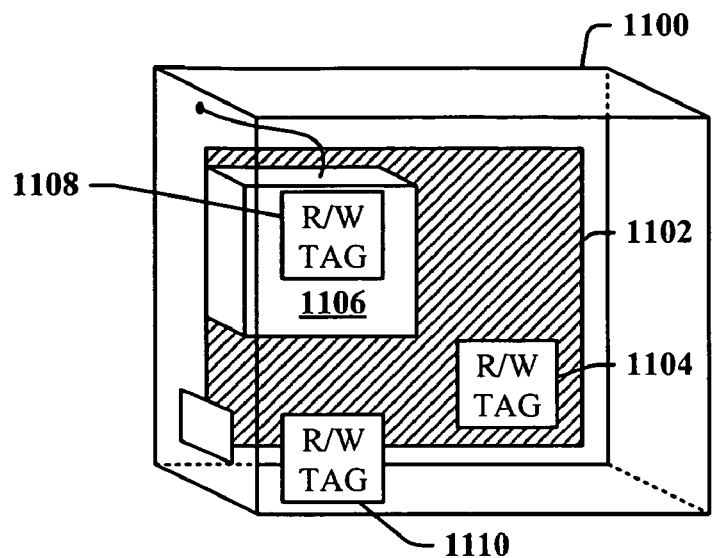
FIG. 11 illustrates the use of RFID R/W technology for tagging controller components in accordance with the subject invention.

FIG. 11 illustrates the use of RFID R/W technology for tagging controller components in accordance with the subject invention. RFID R/W tag technology be incorporated into all major controller (e.g., PLC) components and utilized for wireless communication both between controller system components and between the controller and other devices, locations, and media. The use of RFID to store and exchange information includes the following uses: electronic keying—RFID in a rack and on modules can now be processed for agreement; security information can be based and stored at the physical device level, whereas a processor could be at a different level than I/O; module diagnostics and warranty information can be read from the tagged module without the current requirement to program logic to monitor diagnostic bits, for example; series and revision levels code be read and verified more easily; a rack-based tag can store the I/O configuration, for example, so that a replacement module can easily be inserted and powered up sooner; and, a smart module would automatically know it is a valid replacement and could automatically read its configuration and setup information.

Referring again to FIG. 11, a controller module 1100 (similar to the controller 400 of FIG. 4) is provided with RFID tags on selected components. For example, the controller 1100 includes a motherboard 1102 having an associated motherboard RFID read/write tag 1104, an internal RFID reader 1106 having an attached RFID read/write tag 1108, and a controller RFID read/write tag 1110 attached to the controller 1100. Each of the tags (1104, 1108, and 1110) stores data related to its corresponding component (1102, 1106, and 1100).

Note that if passive RFID tags are employed on components internal to the controller itself, and with the reader integrated therein, the reader will continuously read the internal passive tags, thereby causing unnecessary tag processing. By employing active tags, communications with the reader can now be initiated from the active tag when events and/or attributes change or when it is expected that the reader should have received data or information.

Figure 12:
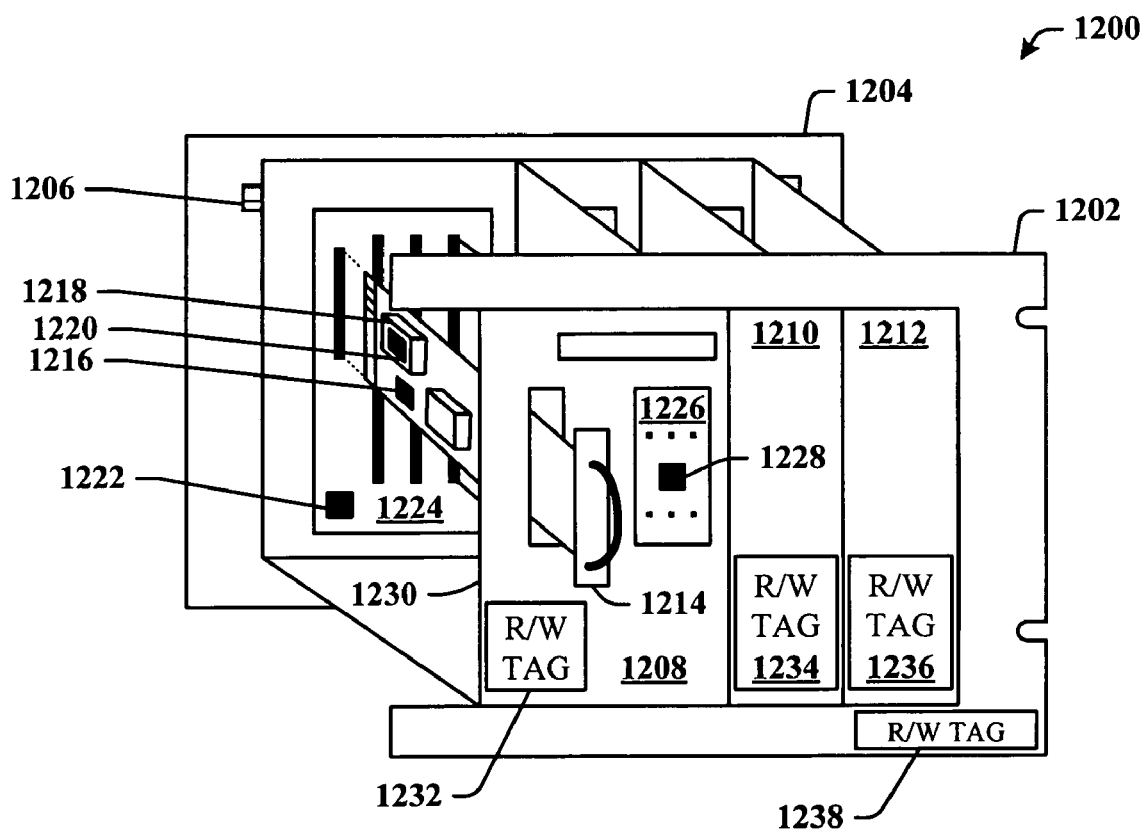
FIG. 12 illustrates the use of RFID R/W technology for tagging crate components and modules in accordance with the subject invention.

FIG. 12 illustrates the use of RFID R/W technology for tagging crate components and modules in accordance with the subject invention. A crate 1200 is shown having a crate front panel 1202, and a back panel 1202 with a network medium 1206 (e.g., wired, optical fiber, ... ) that can electrically/electronically interconnect a controller module 1208, a first module 1210 and a second module 1212. The controller 1208 includes internal components that can also be tagged. For example, the controller 1208 includes a slidably removable card 1214 that has attached thereto a card tag 1216 that stores data related to that card 1214. Additionally, the card 1214 includes a card module 1218 that has attached thereto a card module tag 1220 that stores data related to that card module 1218. The controller 1208 can also have an internal RFID tag 1222 that identifies a controller back panel 1224, for example, and its related components, connectors, etc. The controller 1208 can also include an indicator module 1226 having an indicator module RFID tag 1228 that stores related data. Affixed to a front panel 1230 of the controller 1208 is a controller RFID tag 1232 that can include component data of some or all of its related components (e.g., card 1214, card module 1218, back panel 1224, front panel 1230, controller settings data, configuration data, warranty data, diagnostics data, ... ).

Likewise, the first rack module 1210 includes a first module RFD tag 1234 that can store some or all hardware and/or software information related thereto, and the second rack module 1212 includes a second module RFID tag 1236 that can store some or all hardware and/or software information related to it.

The crate front panel 1202 has affixed thereto a crate RFID tag 1238 that can contain data related to the crate 1200 (e.g., backplane 1206) and any or all of its modules and/or module subcomponents (e.g., controller 1208, first module 1210, second module 1212, card module 1218, ... ). If the card 1214 is an RFID R/W component, it can read data from all crate, module, and component tags, and write data to the same tags.

Figure 13:
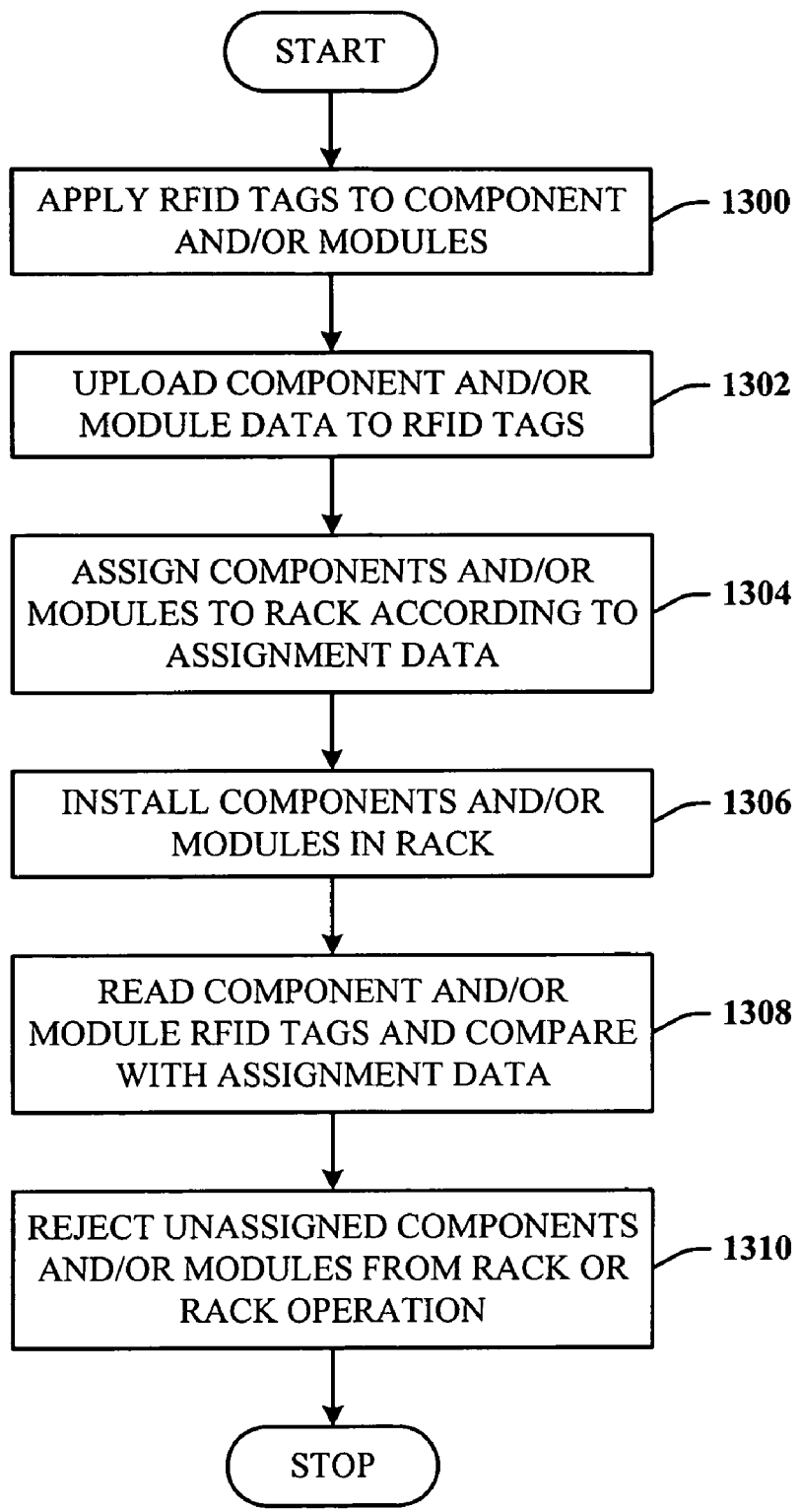
FIG. 13 illustrates a methodology of utilizing electronic keying in an RFID tag to verify proper component assignments in accordance with the invention.

FIG. 13 illustrates a methodology of utilizing electronic keying in an RFID tag to verify proper component assignments in accordance with the invention. At 1300, an RFID tag is applied to each component and/or module as desired. Where this is a software component or module, an RFID tag can be applied to any convenient place. At 1302, component and/or module data is uploaded to each corresponding tag. At 1304, the components and/or modules are assigned to a rack according to assignment data. At 1306, the components and/or modules are installed into the rack. At 1308, once installed, each tag is read to ensure that the installed components and/or modules are the ones desired to be installed. At 1310, any component and/or module that does not conform to the assignment data is rejected. That is, an alert or notification can be communicated. Additionally, the component and/or module can be prevented from operating.

Figure 14:
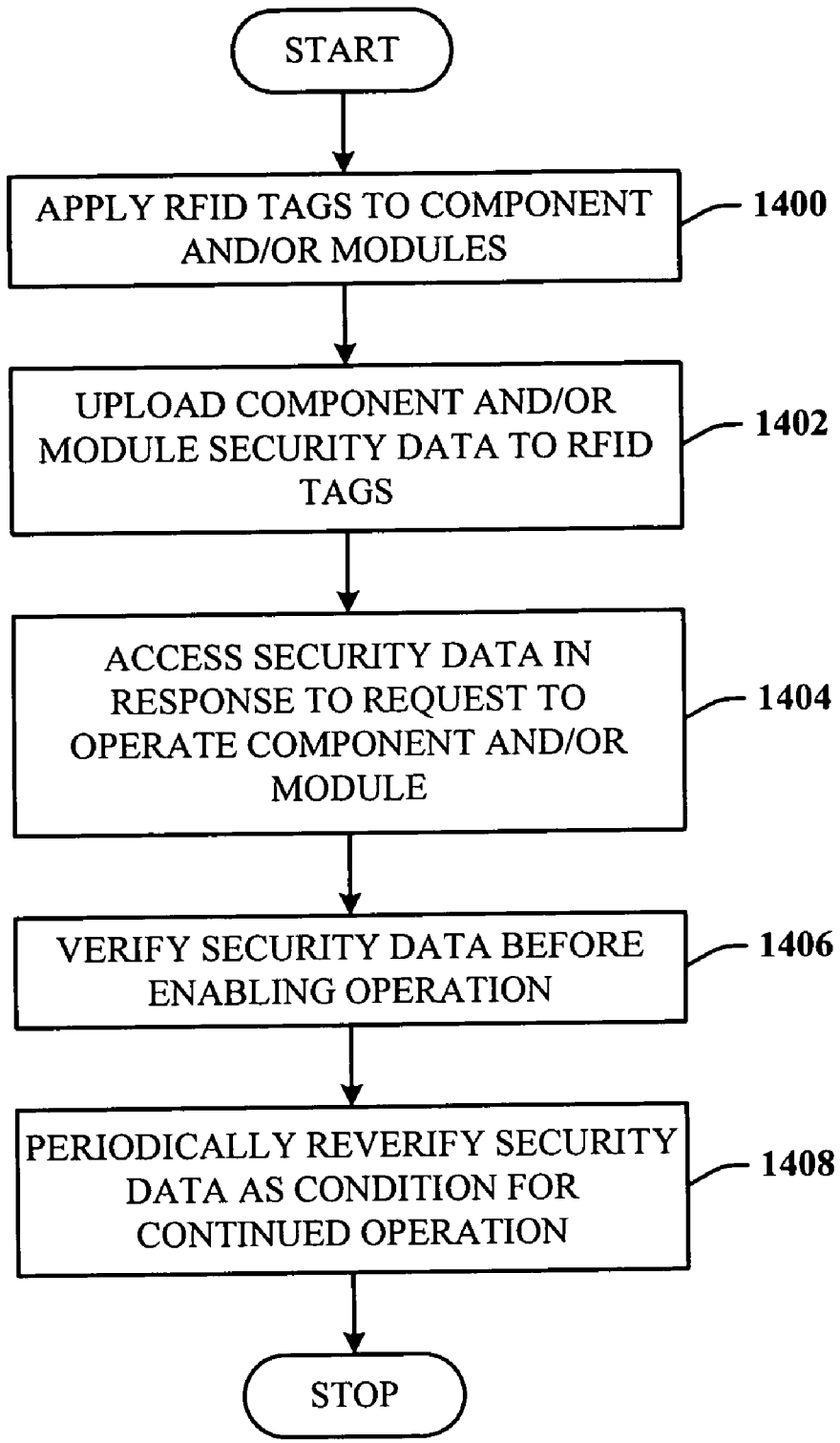
FIG. 14 illustrates a methodology of security information in an RFID tag to enable component operation in accordance with the invention.

FIG. 14 illustrates a methodology of security information in an RFID tag to enable component operation in accordance with the invention. At 1400, apply RFID tags to components and/or modules. At 1402, upload component and/or module security data to RFID tags. At 1404, access security data in response to a request to operate the component and/or module. At 1406, verify the security data before enabling operation. At 1408, the system can periodically reverify the security data as a condition for continued operation.

Figure 15:
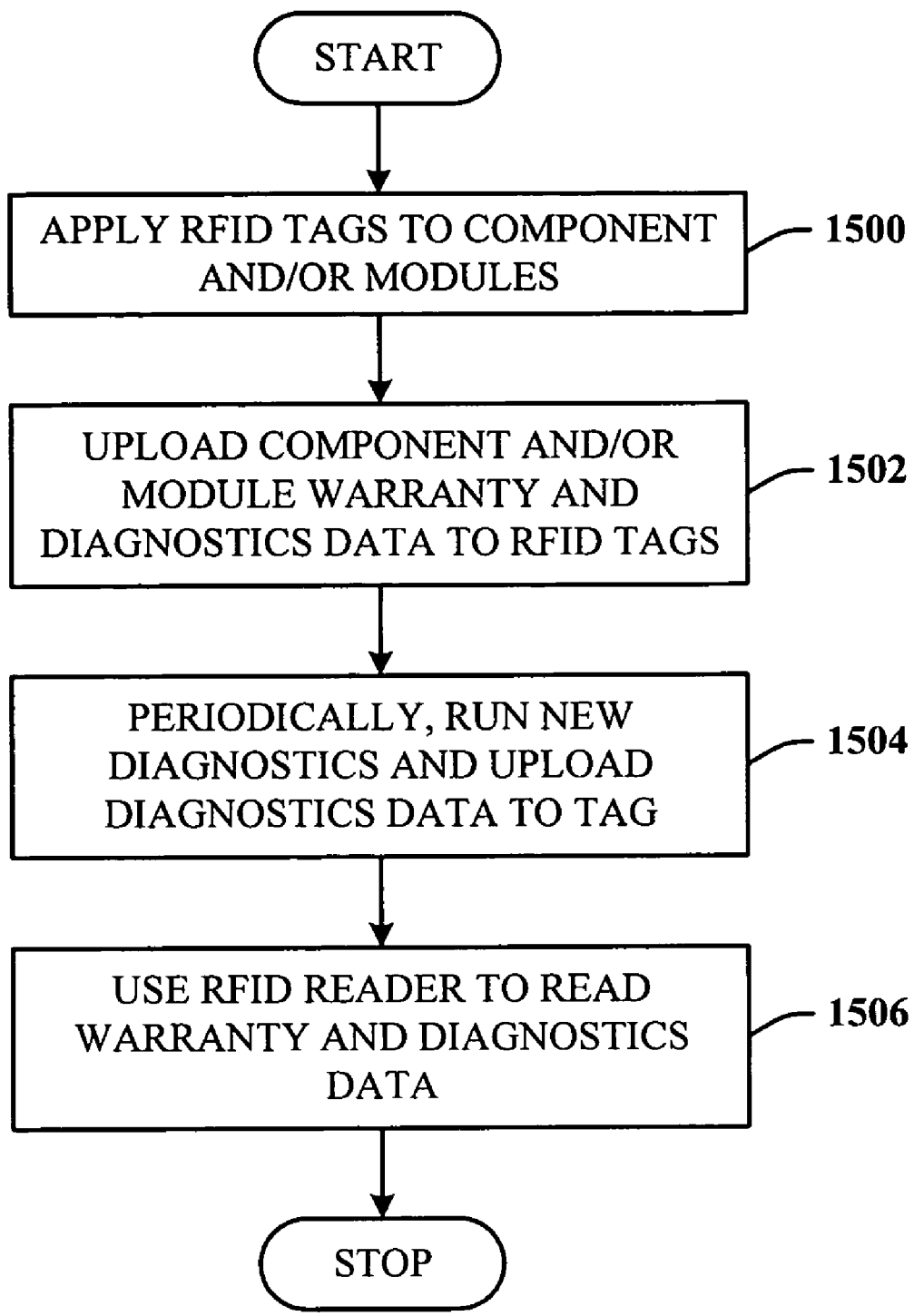
FIG. 15 illustrates a methodology of processing warranty and diagnostics information in an RFID tag in accordance with the invention.

FIG. 15 illustrates a methodology of processing warranty and diagnostics information in an RFID tag in accordance with the invention. At 1500, apply RFID tags to components and/or modules. At 1502, upload warranty and/or diagnostics data to the RFID tags. At 1504, periodically, run new diagnostics and upload new diagnostics data to RFID tag. At 1506, use RFID reader to read warranty and/or diagnostics data, as desired.

Figure 16:
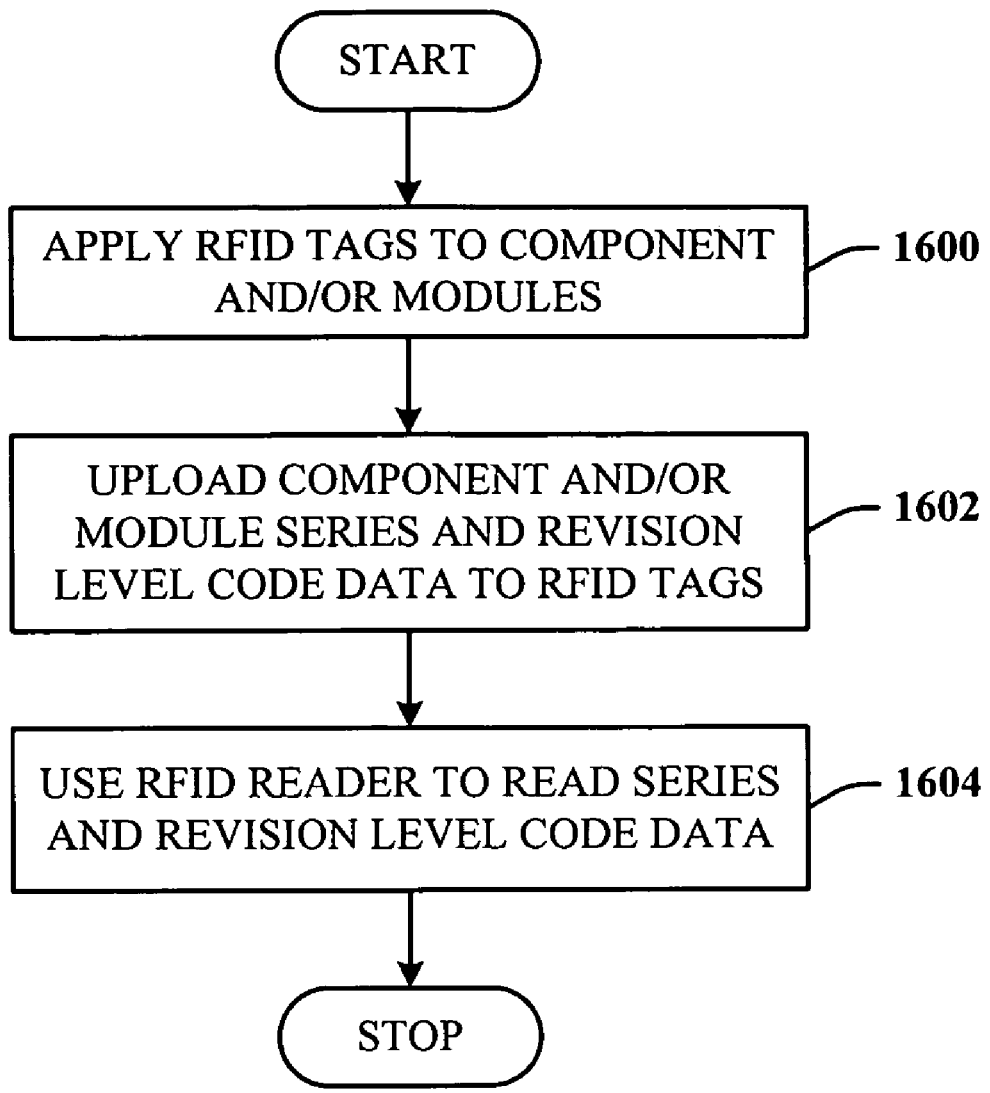
FIG. 16 illustrates a methodology of utilizing series and revision level code information in an RFID tag in accordance with the invention.

FIG. 16 illustrates a methodology of utilizing series and revision level code information in an RFID tag in accordance with the invention. At 1600, apply RFID tags to components and/or modules. At 1602, upload series and/or revision level code data to RFID tags of corresponding components and/or modules. At 1604, use RFID reader to read series and/or revision level code data of component.

Figure 17:
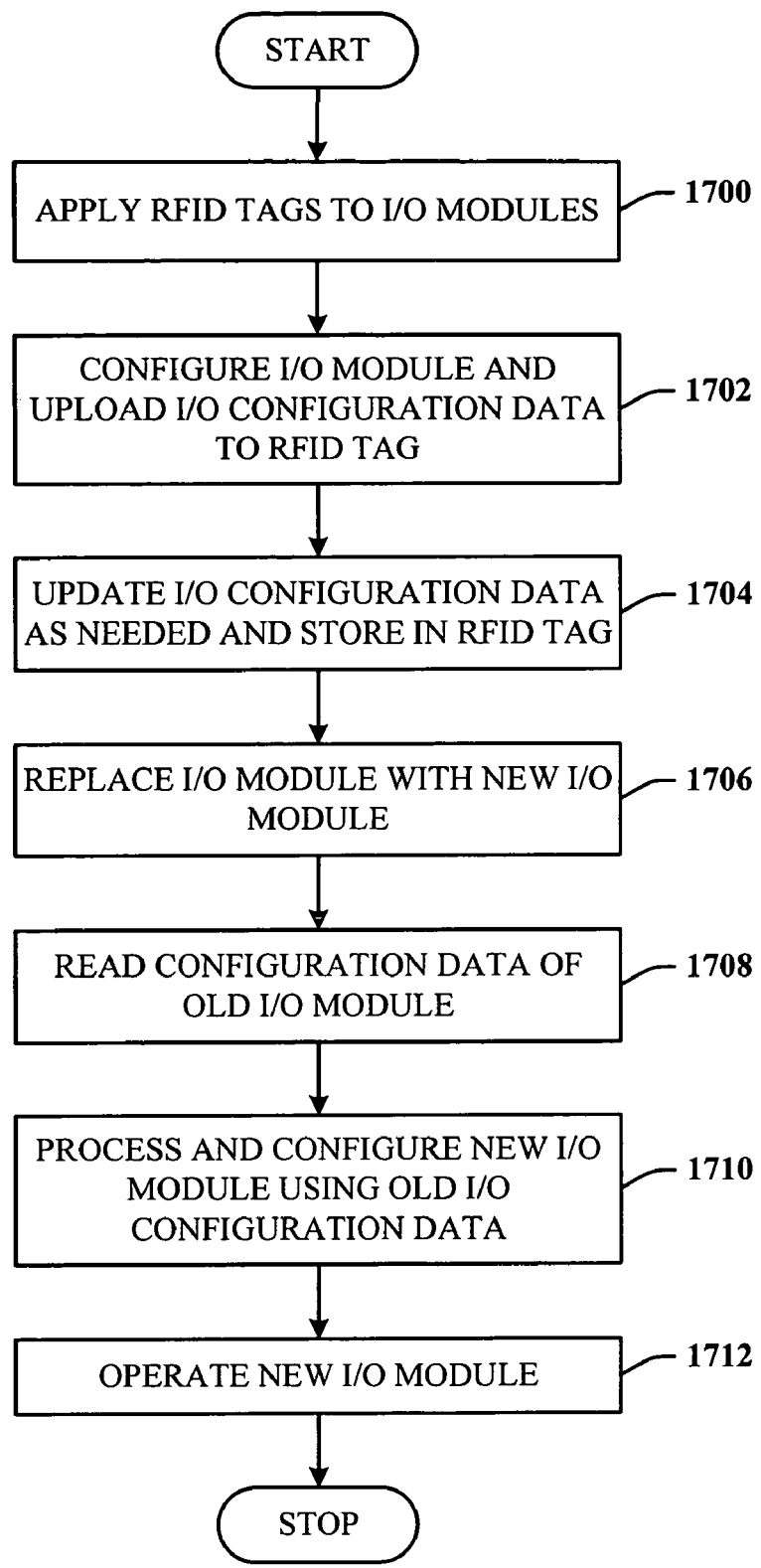
FIG. 17 illustrates a methodology of utilizing module I/O configuration information in an RFID tag in accordance with the invention.

FIG. 17 illustrates a methodology of utilizing module I/O configuration information in an RFID tag in accordance with the invention. At 1700, apply RFID tags to I/O modules. At 1702, configure an I/O module and upload I/O configuration data to corresponding RFID tag. At 1704, update the I/O configuration data as needed, and store in the RFID tag. At 1706, replace the I/O module with a new I/O module. At 1708, read configuration data of old I/O module. At 1710, process and configure the new I/O module using the old I/O module configuration data. At 1712, operate the new I/O module.

Figure 18:
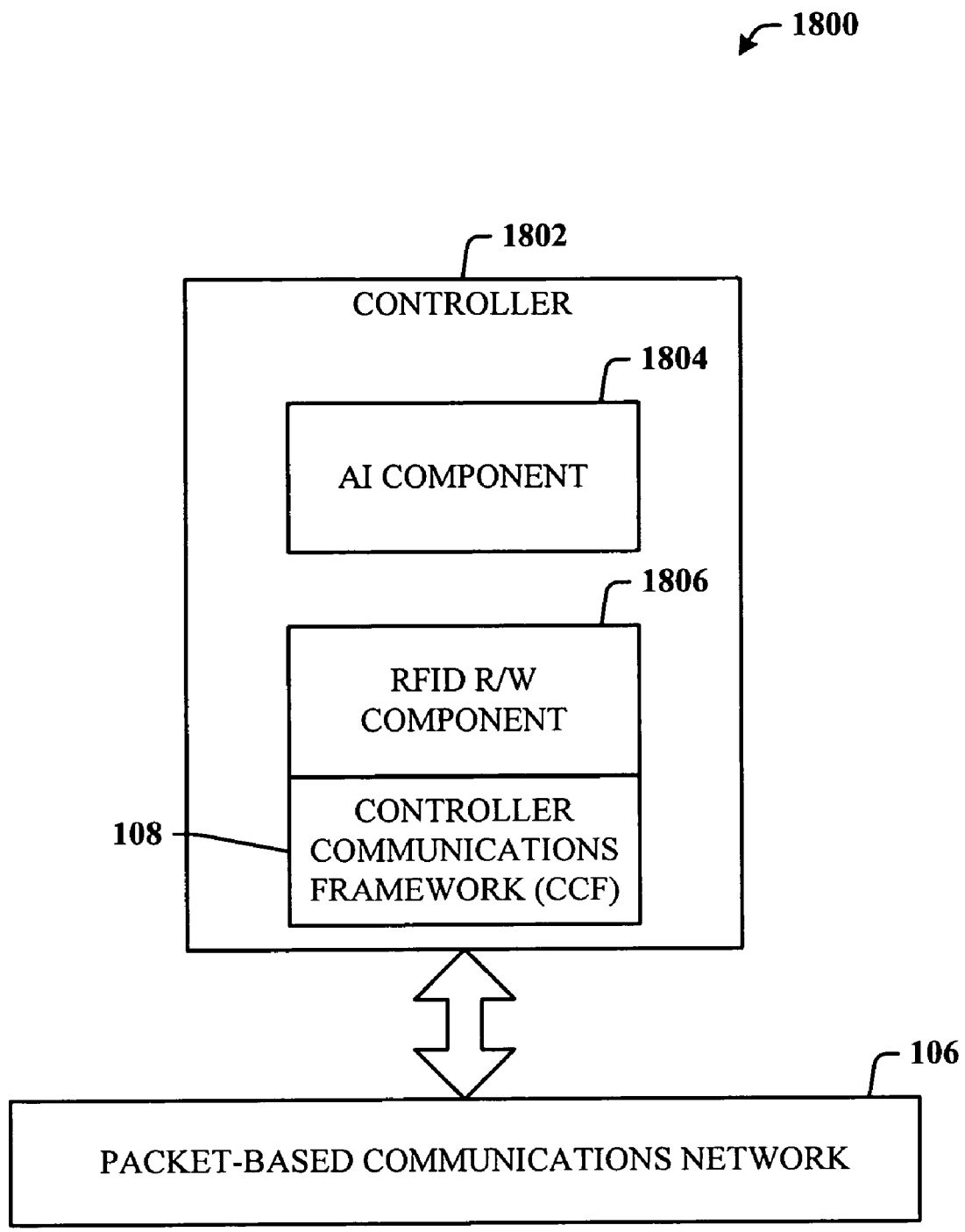
FIG. 18 illustrates an RFID system that employs artificial intelligence which facilitates automating one or more features in accordance with the subject invention.

FIG. 18 illustrates an RFID system 1800 that employs artificial intelligence (AI) which facilitates automating one or more features in accordance with the subject invention. In this implementation, the system 1800 includes a controller 1802 that hosts an AI component 1804. The AI component 1804 can monitor signals and data of the controller 1802, RFID R/W processes of an internal RFID R/W component 1806, and generally, any information that is carried over the CCF 108. Thus, information communicated on the CCF 108 and even the network 106 can also be monitored.

The subject invention (e.g., in connection with selection) can employ various AI-based schemes for carrying out various aspects thereof. For example, a process for determining when to upload diagnostics data and when to read RFID data can be facilitated via an automatic classifier system and process. Moreover, where an RFID database is distributed across locations that are remote from the controller, the classifier can be employed to determine which database location will be selected for uploading RFID data or from retrieving data therefrom.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or a training phase within a classifier constructor and feature selection module. Thus, the classifier(s) can be used to automatically learn and perform a number of functions, including but not limited to determining according to a predetermined criteria when to initiate new diagnostics testing and accelerate new diagnostics uploads to the RFID tag of a module.

The AI component 1804 can also be employed to determine under what conditions one RFID reader (or R/W) should be disabled or powered down relative to another. In another example, AI component 1804 can be employed to detect RFID tags related to a second RFID reader (not shown), and then signal the second RFID reader to turn on based on information provided that a pallet or product with a tag associated with that RFID reader is approaching. This cueing information can be provided by other sensor systems or dataform reading system (e.g., bar code scanning systems, other RFID reading systems, and so on). For example, a multi-input controller can be provided information or sense information that can aid in filtering the data. By utilizing a multi-input controller, it can be known when a pallet enters a certain area because of presence sensors that indicate when the pallet has gone through this area (e.g., using bar code label, RFID tag, . . . ). So not only signal strength data can be employed, but additional sensing data that the controller has about the environment that can be utilized for filtering. More specifically, when employing both a bar code tag and an RFID tag, the controller reads the bar code label at a previous fixed location. Since it is a fixed location, the controller "knows" the recent location of the pallet. Thus, the controller can cue the reader that the pallet will arrive at this location very shortly. As a result, the controller can cue the RFID reader to wake up and go to sleep at predetermined times or intervals. Without this capability, the reader would be on continuously, and reading anything within its RF field-of-view.

Where each RFID R/W component includes an AI component, this can include "self learning" whereby the components communicate with each other and learn patterns and/or characteristics related to the RFID R/W components, controllers, backplane activity, RFID tag activity, etc. The controller does not need to be involved in this self-learning process.

In another example, the AI component can be employed to process signal strengths and determine therefrom which R/W components to assign to tags and/or sets of tags that are in range of communication.

Figure 19:
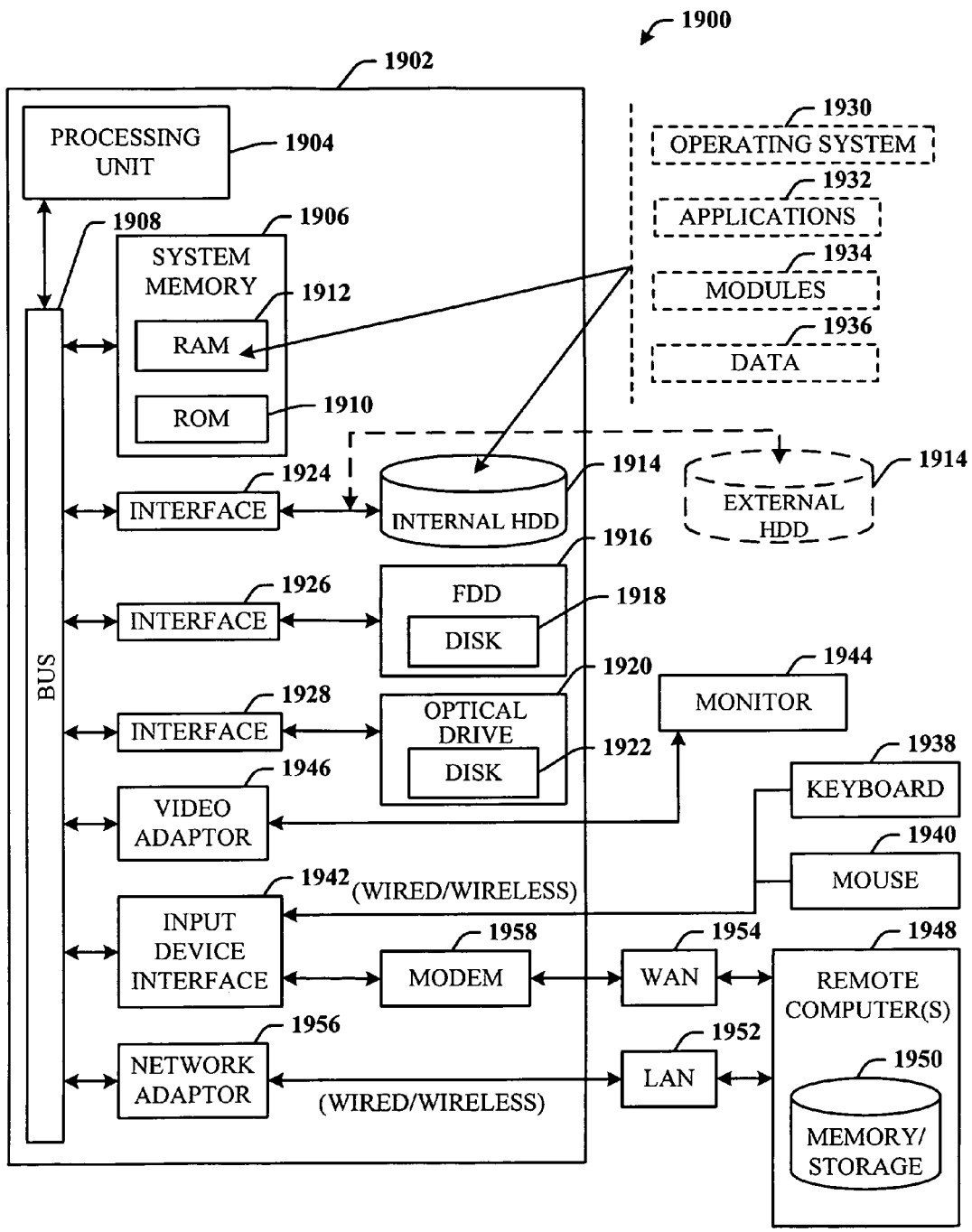
FIG. 19 illustrates a block diagram of a computer operable to execute the disclosed architecture.

Referring now to FIG. 19, there is illustrated a block diagram of a computer operable to execute the disclosed architecture. In order to provide additional context for various aspects of the subject invention, FIG. 19 and the following discussion are intended to provide a brief, general description of a suitable computing environment 1900 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 19, the exemplary computing environment 1900 for implementing various aspects of the invention includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures may also be employed as the processing unit 1904.

The system bus 1908 can be any of several types of bus structure that may further interconnect to a memory bus (with or without a memory controller), a peripheral bus, and a local bus using any of a variety of commercially available bus architectures. The system memory 1906 includes read only memory (ROM) 1910 and random access memory (RAM) 1912. A basic input/output system (BIOS) is stored in a non-volatile memory 1910 such as ROM, EPROM, EEPROM, which BIOS contains the basic routines that help to transfer information between elements within the computer 1902, such as during start-up. The RAM 1912 can also include a high-speed RAM such as static RAM for caching data.

The computer 1902 further includes an internal hard disk drive (HDD) 1914 (e.g., EIDE, SATA), which internal hard disk drive 1914 may also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. It is appreciated that the invention can be implemented with various commercially available operating systems or combinations of operating systems.

A user can enter commands and information into the computer 1902 through one or more wired/wireless input devices, e.g., a keyboard 1938 and a pointing device, such as a mouse 1940. Other input devices (not shown) may include a microphone, an IR remote control, a joystick, a game pad, a stylus pen, touch screen, or the like. These and other input devices are often connected to the processing unit 1904 through an input device interface 1942 that is coupled to the system bus 1908, but can be connected by other interfaces, such as a parallel port, an IEEE 1394 serial port, a game port, a USB port, an IR interface, etc.

A monitor 1944 or other type of display device is also connected to the system bus 1908 via an interface, such as a video adapter 1946. In addition to the monitor 1944, a computer typically includes other peripheral output devices (not shown), such as speakers, printers, etc.

The computer 1902 may operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1902 is connected to the local network 1952 through a wired and/or wireless communication network interface or adapter 1956. The adaptor 1956 may facilitate wired or wireless communication to the LAN 1952, which may also include a wireless access point disposed thereon for communicating with the wireless adaptor 1956.

When used in a WAN networking environment, the computer 1902 can include a modem 1958, or is connected to a communications server on the WAN 1954, or has other means for establishing communications over the WAN 1954, such as by way of the Internet. The modem 1958, which can be internal or external and a wired or wireless device, is connected to the system bus 1908 via the serial port interface 1942. In a networked environment, program modules depicted relative to the computer 1902, or portions thereof, can be stored in the remote memory/storage device 1950. It will be appreciated that the network connections shown are exemplary and other means of establishing a communications link between the computers can be used.

The computer 1902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 20:
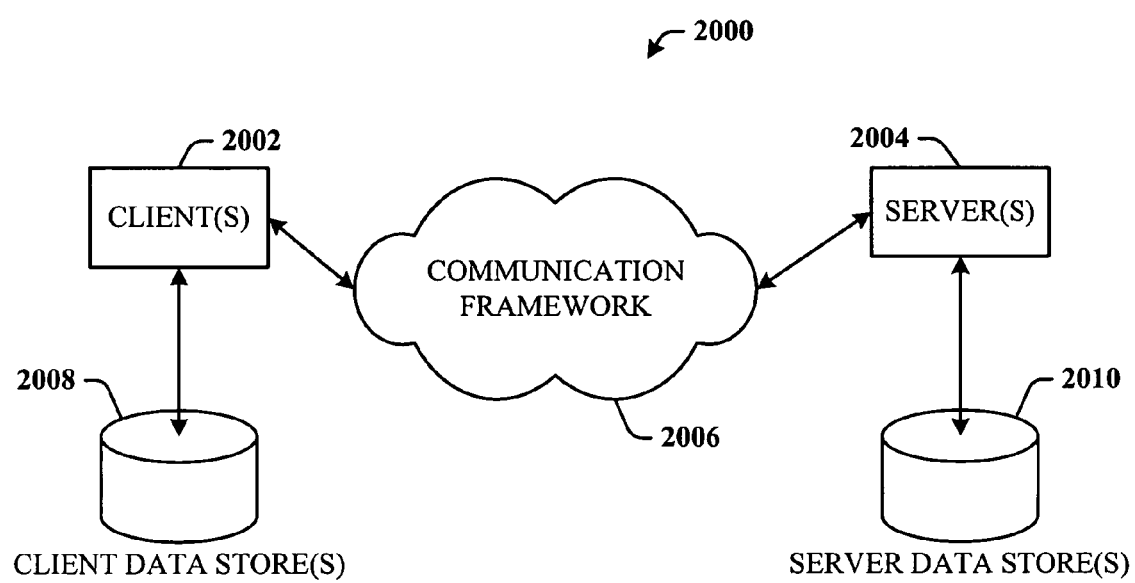
FIG. 20 illustrates a schematic block diagram of an exemplary computing environment in accordance with the subject invention.

Referring now to FIG. 20, there is illustrated a schematic block diagram of an exemplary computing environment 2000 in accordance with the subject invention. The system 2000 includes one or more client(s) 2002. The client(s) 2002 can be hardware and/or software (e.g., threads, processes, computing devices). The client(s) 2002 can house cookie(s) and/or associated contextual information by employing the invention, for example.

The system 2000 also includes one or more server(s) 2004. The server(s) 2004 can also be hardware and/or software (e.g., threads, processes, computing devices). The servers 2004 can house threads to perform transformations by employing the invention, for example. One possible communication between a client 2002 and a server 2004 can be in the form of a data packet adapted to be transmitted between two or more computer processes. The data packet may include a cookie and/or associated contextual information, for example. The system 2000 includes a communication framework 2006 (e.g., a global communication network such as the Internet) that can be employed to facilitate communications between the client(s) 2002 and the server(s) 2004.

Communications can be facilitated via a wired (including optical fiber) and/or wireless technology. The client(s) 2002 are operatively connected to one or more client data store(s) 2008 that can be employed to store information local to the client(s) 2002 (e.g., cookie(s) and/or associated contextual information). Similarly, the server(s) 2004 are operatively connected to one or more server data store(s) 2010 that can be employed to store information local to the servers 2004.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An RFID system, comprising:
   a controller having an internal controller communications framework that facilitates communications between components connected thereto;
   an RFID (radio frequency identification) reader that interfaces to the internal controller communications framework and communicates RFID information to the controller; and
   an RFID tagging component, which encompasses security information to enable component operation that uploads security data to RFID tags, accesses security data in response to a request to operate the component, and periodically reverifies the security data as a condition for continued operation.

2. The system of claim 1, wherein the RFID reader is also a writer.

3. The system of claim 1, wherein the internal controller communications framework is packet-based.

4. The system of claim 1, wherein the RFID reader is manufactured as part of the internal controller communications framework.

5. The system of claim 1, wherein the RFID reader is manufactured an internal component of the controller.

6. The system of claim 1, wherein the RFID reader is a module that is separate from the controller.

7. The system of claim 1, wherein configuration data of the RFID reader is stored in the controller.

8. The system of claim 1, wherein the RFID reader reads the RFID tag and stores RFID tag information in the controller.

9. The system of claim 8, wherein the RFID tag information is communicated from the reader and stored directly into a memory of the controller.

10. The system of claim 8, wherein presence of the tag information triggers activation of middleware software which is utilized to process the tag information.

11. The system of claim 1, wherein a task is initiated in response to the RFID reader reading a tag.

12. The system of claim 1, further comprising a middleware software component internal to RFID reader and that interfaces to the internal controller communications framework.

13. The system of claim 1, wherein the RFID reader communicates over the internal controller communications framework according to a CIP (Common Industrial Protocol) communications technology.

14. The system of claim 1, wherein the controller acts as a master device relative to the RFID reader which is a slave device.

15. The system of claim 1, wherein at least one of the controllers has associated therewith a controller RFID tag that includes controller data and the RFID reader has associated therewith a reader RFID tag that includes reader data.

16. The system of claim 1, wherein the internal controller communications framework facilitates communications to a remote node of a network via a network interface.

17. The system of claim 1, wherein the RFID reader reads RFID data from a component tag attached to a component that is internal to the controller.

18. The system of claim 1, further comprising an artificial intelligence (AI) component that employs probabilistic and/or statistical-based analysis to prognose or infer an action that a user desires to be automatically performed.

19. The system of claim 1, further comprising a signal strength processing component that processes signal strength values of RFID tags associated with a plurality of RFID readers.

20. The system of claim 19, wherein the signal processing component is internal to at least one of the controller and the RFID reader.

21. The system of claim 1, wherein the controller includes the RFID reader to read RFID data of an RFID tag and a bar code scanner to read bar code data of a bar code.

22. The system of claim 21, wherein the controller compares a portion of the bar code data with a portion of the RFID data.

23. A rack-mountable system, comprising:
a rack that includes a communications connection and slots for receiving modules that interface to the connection;
a controller that is insertable into the rack, manages signals and data,
an RFID reader that interfaces to the packet-based communication framework to communicate RFID information; and
an RFID tagging component, which encompasses security information to enable component operation that uploads security data to RFID tags, accesses security data in response to a request to operate the component, and periodically reverifies the security data as a condition for continued operation.

24. The system of claim 23, wherein the RFID reader is housed as a module that is separate from the controller, and which module inserts into the rack.

25. The system of claim 23, wherein the RFID reader is housed in a chassis that also houses the controller, and the RFID reader communicated RFID tag data to the controller via the packet-based communications framework.

26. The system of claim 23, wherein the RFID reader includes a middleware software component that processes tag data.

27. The system of claim 23, further comprising an RFID tag associated with the controller such that the RFID tag initiates communications with the RFID reader when an event or an attribute changes.

28. The system of claim 23, wherein the rack is associated with a rack tag that stores component data of one or more modules of the rack.

29. The system of claim 23, wherein the controller is associated with a controller tag that stores component data associated with internal controller components.

30. The system of claim 23, wherein the controller includes a component tag that is associated with a corresponding internal controller component.

31. The system of claim 30, wherein the RFID reader reads the component tag to determine a status of the corresponding internal controller component.

32. The system of claim 30, wherein the RFID reader reads the component tag to enable operation of the corresponding internal controller component.

33. The system of claim 30, wherein the RFID reader reads the component tag to determine at least one of warranty and diagnostic data related to the corresponding internal controller component.

34. The system of claim 30, wherein the RFID reader reads the component tag to determine at least one of series code data and revision code data.

35. The system of claim 30, wherein the RFID reader reads the component tag to determine if the internal controller component is a correct component for installation in the rack.

36. The system of claim 30, wherein the internal controller component is the RFID reader.

37. The system of claim 23, wherein the controller receives and processes the RFID information into a secure data stream that is transmitted to a remote database.

38. The system of claim 23, wherein the controller is one of a programmable logic controller (PLC) and a small logic controller (SLC).

39. An RFID system, comprising:
a first RFID component that at least one of reads data from and writes data to a plurality of RFID tags;
a PLC module that controls an automation process, which facilitates processing of the plurality of RFID tags; and
an RFID tagging component, which encompasses security information to enable component operation that uploads security data to RFID tags, accesses security data in response to a request to operate the component, and periodically reverifies the security data as a condition for continued operation.

40. The system of claim 39, wherein the PLC includes a signal strength processing component that receives and processes signal strength data from the first RFID component and a second RFID component, and in response thereto, assigns the first RFID component to a subset of the plurality of RFID tags and the second RFID component to another subset of the plurality of RFID tags.

41. The system of claim 39, wherein the first RFID component is part of one of the PLC module and a standalone crate module, and the second RFID component is disposed as a remote network node.

42. The system of claim 39, wherein the PLC module utilizes internal information associated with material movement to filter the data.

43. A method of providing an RFID-based industrial automation system, comprising:
providing a controller that interacts with one or more aspects of an automation process;
integrating an RFID reader in the industrial controller such that RFID tag data read from an RFID tag associated with the automation process is communicated internally from the RFID reader to the controller; and
uploading security data to RFID tags, accessing security data in response to a request to operate the component, and periodically reverifing the security data as a condition for continued operation.

44. The method of claim 43, further comprising communicating the tag data via a packet-based communications framework that is common to both the RFID reader and the controller.

45. The method of claim 43, wherein the controller is a PLC.

46. The method of claim 43, further comprising at least one of the acts of:
automatically powering down the RFID reader after a predetermined number of read operations; and
automatically powering down the RFID reader after a predetermined time duration.

47. The method of claim 43, further comprising accessing a complete history of an object associated with the RFID tag in response to reading the RFID tag.

48. The method of claim 43, further comprising automatically initiating a task in response to reading the RFID tag.

49. The method of claim 48, wherein the task is executed in at least one of the controller and the RFID reader.

50. The method of claim 43, further comprising reading sensor diagnostics data from the RFID tag.

51. The method of claim 43, further comprising enabling operation of the controller only if series and revision code data stored in an associated controller RFID tag is verified.

52. A method of providing an RFID-based industrial automation system, comprising:
providing a controller that interacts with one or more aspects of an automation process;
integrating an RFID reader in the industrial controller such that RFID tag data read from an RFID tag associated with the automation process is communicated internally from the RFID reader to the controller; and
tagging a component of the controller; and uploading security data to RFID tags, accessing security data in response to a request to operate the component, and periodically reverifing the security data as a condition for continued operation.

53. The method of claim 52, further comprising acts of:
applying the RFID tag to the component that is the industrial controller;
writing at least one of warranty data, diagnostics data, and key data of the controller to the RFID tag; and
updating the at least one of warranty data, diagnostics data, and key data of the controller to the RFID tag.

54. The method of claim 52, further comprising acts of:
applying the RFID tag to the component that is the RFID reader;
writing at least one of warranty data, diagnostics data, and key data of the RFID reader to the RFID tag; and
updating the at least one of warranty data, diagnostics data, and key data of the RFID reader to the RFID tag.

55. The method of claim 52, further comprising acts of:
applying the RFID tag to an internal component of the controller;
writing at least one of warranty data, diagnostics data, and key data of the internal component to the RFID tag; and
updating the at least one of warranty data, diagnostics data, and key data of the internal component to the RFID tag.

56. The method of claim 52, further comprising acts of:
applying the RFID tag to the controller and a second RFID tag to the RFID reader;
writing key data to the RFID tag and second key data to the second RFID tag; and
enabling operation of the controller and the RFID reader only if the key data and the second key data agree.

57. An RFID-based industrial automation system, comprising:
means for controlling one or more aspects of an automation process;
means for reading with a plurality of reading means tag data from an RFID tag associated with the automation process, at least one of the plurality of reading means is internal to the means for controlling;
means for enabling select ones of the plurality of reading means to read the tag data and disabling select ones of the plurality of reading means from reading the tag data; and
means for uploading security data to RFID tags, accessing security data in response to a request to operate the component, and periodically reverifing the security data as a condition for continued operation.

* * * * *